(12) United States Patent
Sasayama

(10) Patent No.: US 8,974,032 B2
(45) Date of Patent: Mar. 10, 2015

(54) IMAGE PROCESSING METHOD, IMAGE PROCESSING DEVICE, RECORDING MEDIUM AND IMAGE FORMATION DEVICE

(71) Applicant: FUJIFILM Corporation, Tokyo (JP)

(72) Inventor: Hiroyuki Sasayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/287,493

(22) Filed: May 27, 2014

(65) Prior Publication Data

US 2014/0354727 A1 Dec. 4, 2014

(30) Foreign Application Priority Data

May 28, 2013 (JP) ................................. 2013-111996

(51) Int. Cl.
*B41J 2/205* (2006.01)
*B41J 2/21* (2006.01)

(52) U.S. Cl.
CPC ..................... *B41J 2/2132* (2013.01)
USPC ............................................. 347/15; 347/19

(58) Field of Classification Search
CPC .............. G03G 15/01; G03G 15/5041; G03G 15/5062; G06K 15/128; G07D 7/20; H04N 1/00864; H04N 1/6033; H04N 1/4078
USPC .................... 347/14, 15, 19, 43, 57
See application file for complete search history.

(56) References Cited

U.S. PATENT DOCUMENTS

| 6,990,249 | B2 * | 1/2006 | Nomura ........................ 382/254 |
| 8,292,401 | B2 * | 10/2012 | Sasayama ....................... 347/19 |
| 2006/0262151 | A1 | 11/2006 | Chiwata |

FOREIGN PATENT DOCUMENTS

| JP | 2000-238299 A | 9/2000 |
| JP | 2006-347164 A | 12/2006 |

* cited by examiner

*Primary Examiner* — Thinh Nguyen
(74) *Attorney, Agent, or Firm* — Studebaker & Brackett PC

(57) ABSTRACT

An image processing method includes: forming a density unevenness measurement test image based on image data subjected to unevenness correction processing to correct density unevenness, using a preset unevenness correction value; acquiring a pre-conversion density measurement value that is a density measurement value of each density setting value for every recording element in the density unevenness measurement test image before processing after image formation using a recording head; converting the pre-conversion density measurement value into a post-conversion density measurement value corresponding to a density measurement value after the processing, using a density measurement value conversion value derived beforehand and indicating a conversion relationship of density measurement values before and after the processing for every density setting value and to which the set unevenness correction value is applied as the density setting value; and deriving a new unevenness correction value using the post-conversion density measurement value.

13 Claims, 13 Drawing Sheets

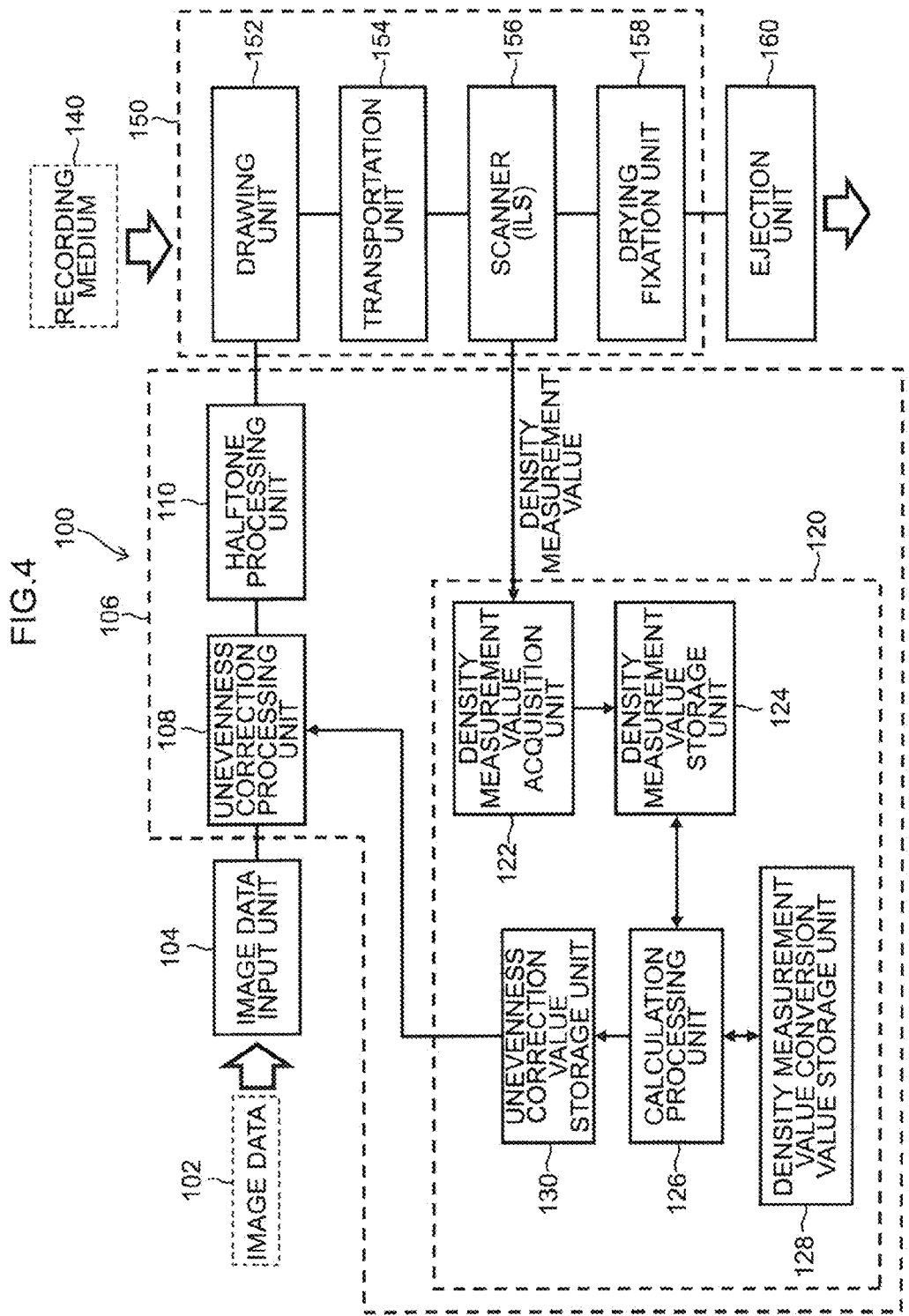

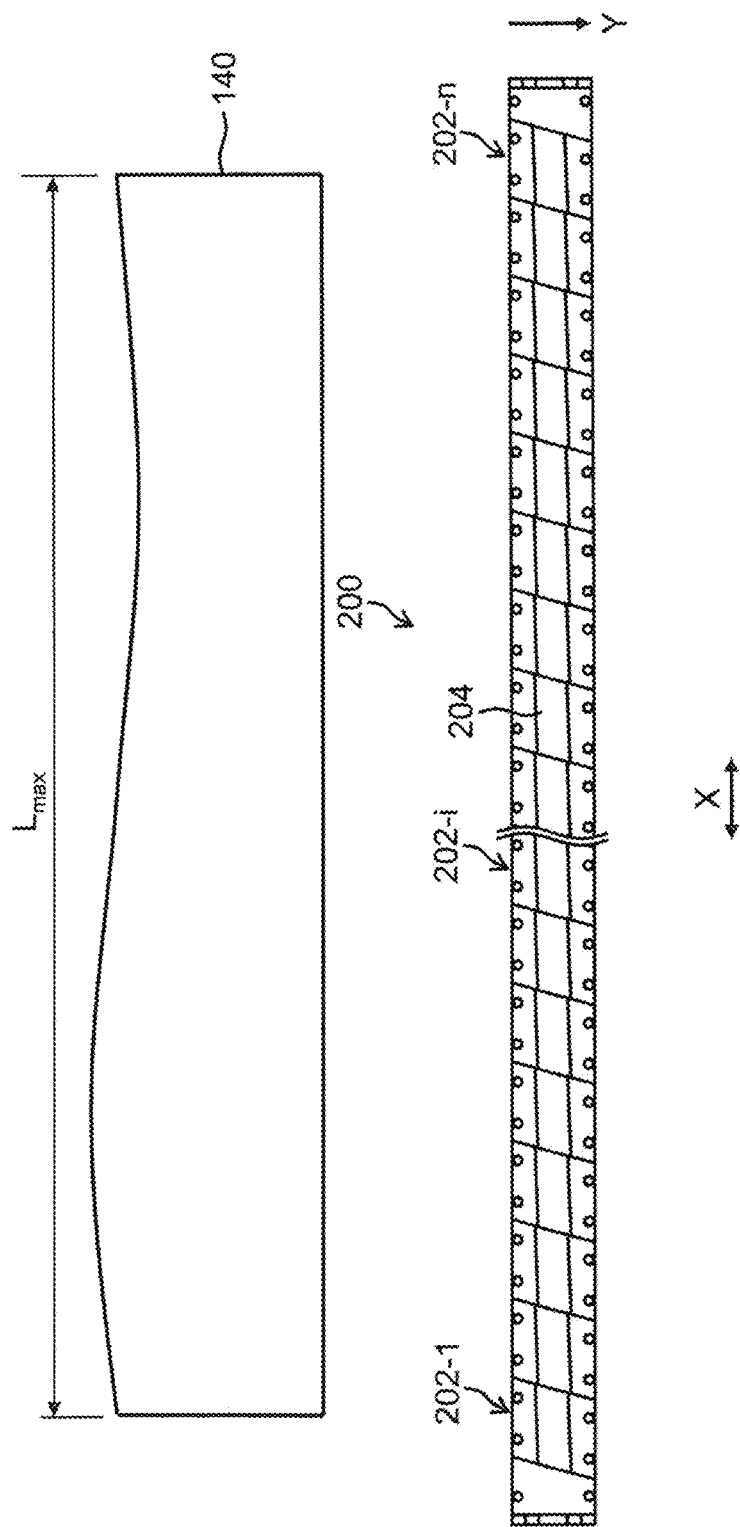

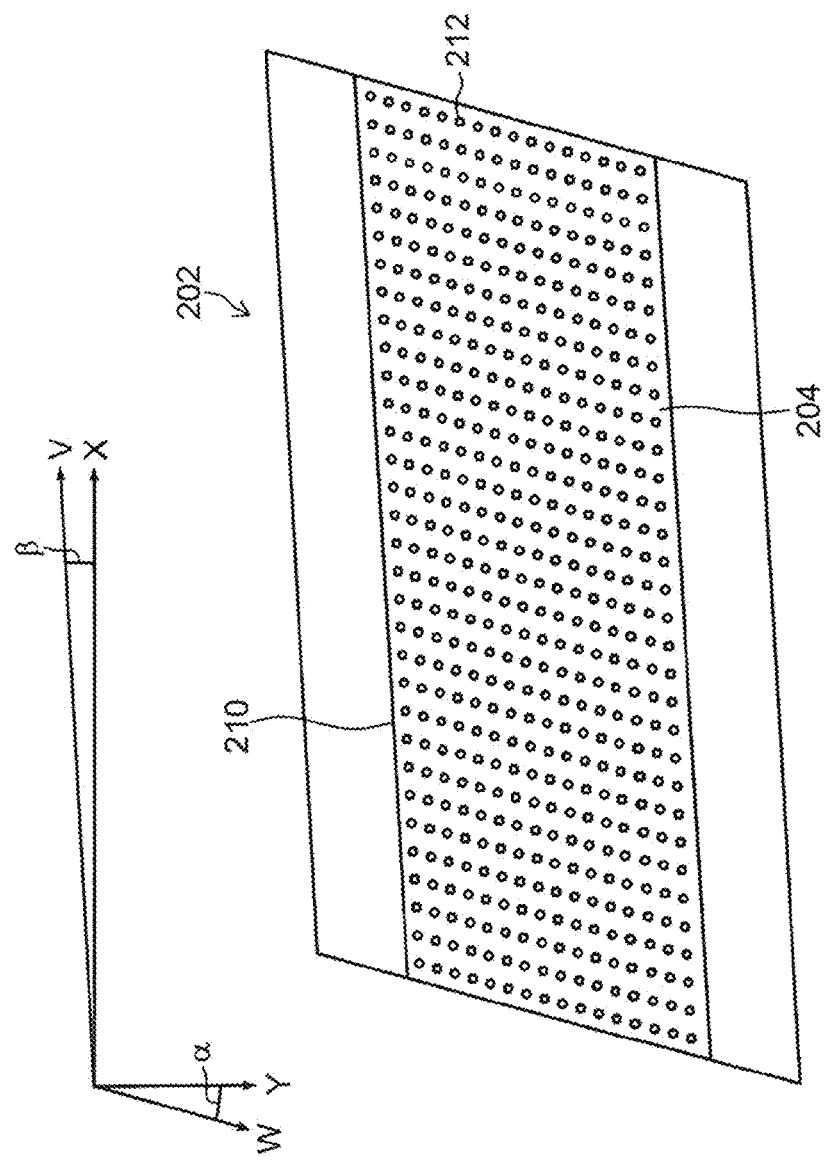

IMAGE PROCESSING METHOD, IMAGE PROCESSING DEVICE, RECORDING MEDIUM AND IMAGE FORMATION DEVICE

CROSS-REFERENCE TO RELATED APPLICATIONS

The present application claims priority under 35 U.S.C. §119 to Japanese Patent Application No. 2013-111996, filed May 28, 2013. Each of the above application is hereby expressly incorporated by reference, in its entirety, into the present application.

BACKGROUND OF THE INVENTION

1. Field of the Invention

The presently disclosed subject matter relates to an image processing method, an image processing device, a recording medium storing an image processing program and an image formation device, especially, a density unevenness correction technique based on the ejection characteristic of each nozzle.

2. Description of the Related Art

As an image formation device that records a color image on a recording medium, an inkjet recording device that ejects a color ink from an inkjet head is known. For instance, it adopts a configuration including the inkjet head corresponding to each color of cyan (C), magenta (M), yellow (Y) and black (K).

In the inkjet head, since there is variability in the ejection characteristic of each nozzle based on the manufacturing variability or the like, the correction value (correction coefficient) is prepared for every nozzle and density setting value (gradation value) beforehand, and correction processing is applied to image data by the use of this correction value.

Japanese Patent Application Laid-Open No. 2000-238299 discloses a printing device that prints a calibration pattern for density calibration on a print medium, detects variability in the ink use amount of each color from read data acquired by reading out that by a reading device, adds a modification to the color conversion table of corresponding element colors so as to overcome this variability, and thereby modifies the print data.

The print device described in Japanese Patent Application Laid-Open No. 2000-238299 foresees the time to fix each color ink on the print medium, acquires the deviation from the reference value of each color ink use amount, modifies print data so as to overcome this deviation, and corrects the gap of the color balance more accurately.

SUMMARY OF THE INVENTION

Generally, in image reading using an imaging element such as an image sensor, illumination light is diagonally irradiated to the image such that the mirror reflection element (component) of the illumination light does not directly enter the image sensor. That is, the light scattering element (component) of the image is mainly entered in the image sensor.

In a state where ink is not sufficiently dried immediately after drawing or after a short elapsed time from the drawing, or in a state where the ink is not sufficiently fixed to a recording medium, light scattering on the ink surface relatively becomes small (the mirror reflection element becomes large). By contrast with this, in a state where the ink is sufficiently dried or the ink is sufficiently fixed to the recording medium, the light scattering on the ink surface relatively becomes large.

Although the same object is imaged, the quantity of light entered in the image sensor is smaller as a whole in the undried/unfixed ink state than a state after the drying/fixing of the ink progresses. As a result, the change in the quantity of entered light reflecting the difference in the ink amount becomes smaller.

Then, it becomes difficult to accurately understand the difference in the ink amount (for example, image density unevenness) from the readout result, and the measurement accuracy of the ink amount decreases.

Meanwhile, the above-mentioned problem is solved by adopting a device configuration in which a drying fixing unit is arranged immediately after a drawing unit and an image sensor is arranged on the downstream side thereof. Meanwhile, it is necessary to hold a recording medium in a fixed manner at the time of drawing or reading by the image sensor, and it has to include a device which individually holds the recording medium in a fixed manner for drawing or reading by the image sensor.

Then, the device size (device scale) becomes larger than a device configuration in which the image sensor is arranged immediately after the drawing unit.

The presently disclosed subject matter is made in view of such a condition, and it is an object to provide an image processing method, image processing device, a recording medium storing image processing program and image formation device that consider a change in the density measurement value caused by a change in the image state and realize preferable image processing using this density measurement value.

To achieve the above-mentioned object, the image processing method according to the presently disclosed subject matter includes: a density unevenness measurement test image formation step of forming a density unevenness measurement test image based on image data subjected to unevenness correction processing to correct density unevenness due to a recording characteristic of multiple recording elements included in a recording head, using a preset unevenness correction value; a density measurement value acquisition step of acquiring a pre-conversion density measurement value that is a density measurement value of each density setting value for every recording element in the density unevenness measurement test image before processing after image formation using the recording head; a density measurement value conversion step of converting the acquired pre-conversion density measurement value into a post-conversion density measurement value corresponding to a density measurement value after the processing, using a density measurement value conversion value which is derived beforehand and indicates a conversion relationship of density measurement values before and after the processing for every density setting value and to which the set unevenness correction value is applied as the density setting value; and an unevenness correction value derivation step of deriving a new unevenness correction value using the post-conversion density measurement value.

According to the presently disclosed subject matter, using a density measurement value conversion value indicating the conversion relationship between density measurement values before or after processing, a pre-conversion density measurement value corresponding to the density measurement value before the processing is converted into a post-conversion density measurement value corresponding to the density measurement value after the processing, an unevenness correction value is derived on the basis of the changed density measurement value, and therefore a new unevenness correction value is derived taking into account the difference in the density measurement value of the image before and after the processing.

BRIEF DESCRIPTION OF THE DRAWINGS

FIG. 4 is a block diagram illustrating a schematic configuration of an image formation device to which the image processing method according to the embodiment of the presently disclosed subject matter is applied;

FIG. 5 is a plan view illustrating a schematic configuration of an inkjet head included in a drawing unit of FIG. 4;

FIG. 6 is a plan perspective view illustrating nozzle arrangement of a head module illustrated in FIG. 5;

FIG. 12A is an explanatory diagram of a mode in which patterns are formed in a central part of a recording medium, and FIG. 12B is an explanatory diagram of a mode in which patterns are separated.

DETAILED DESCRIPTION OF THE EXEMPLARY EMBODIMENTS

In the following, exemplary embodiments of the presently disclosed subject matter are described in detail according to the accompanying drawings.

[Outline of Image Processing Method]

Figure 1:
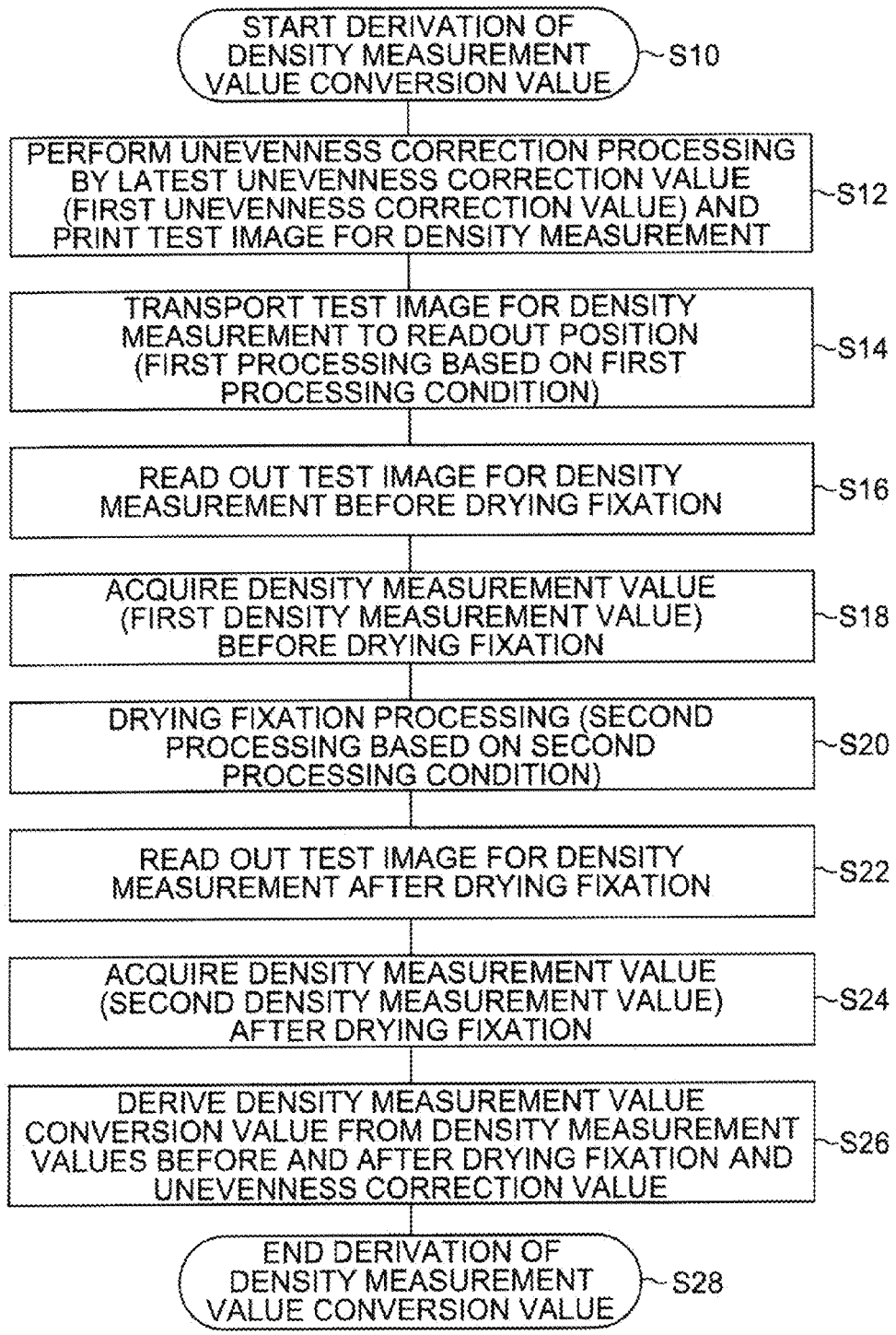
FIG. 1 is a flowchart illustrating a flow of density measurement value conversion value derivation in an image processing method according to an embodiment of the presently disclosed subject matter.
Figure 2:
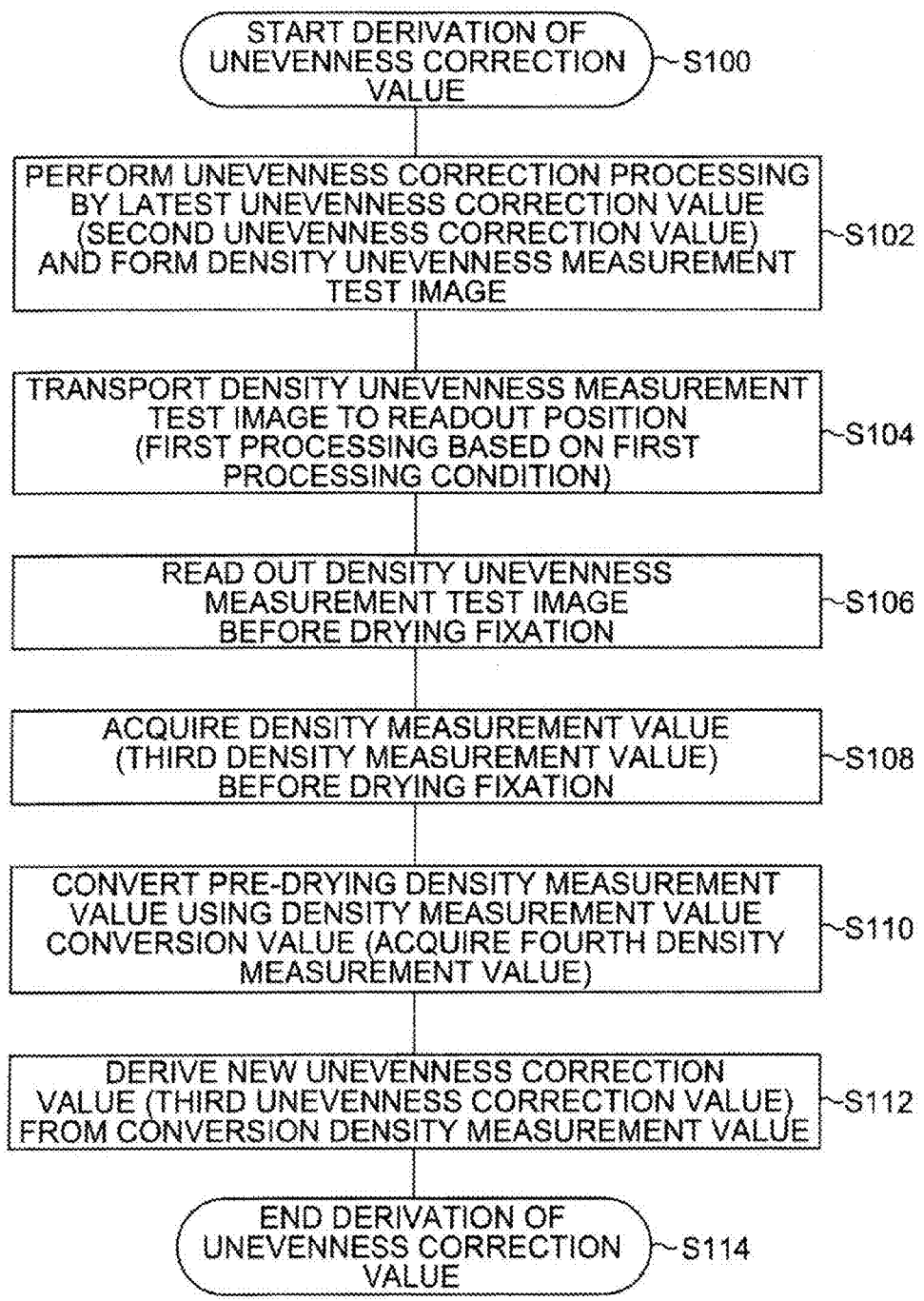
FIG. 2 is a flowchart illustrating a flow of unevenness correction value derivation in the image processing method according to the embodiment of the presently disclosed subject matter.

The image processing method according to an embodiment of the presently disclosed subject matter includes a density measurement value conversion value derivation step of deriving the density measurement value conversion value illustrated in FIG. 1 and an unevenness correction value derivation step of deriving an unevenness correction value from a density measurement value converted using a density measurement value conversion value illustrated in FIG. 2.

Unevenness correction processing is performed on image data by the use of the derived unevenness correction value, and a desired image is formed by the use of an inkjet head (recording head) in which a plurality of nozzles (recording elements) are included. It is described below in detail.

[Description of Density Measurement Value Conversion Value Derivation]

FIG. 1 is a flowchart illustrating a flow of density measurement value conversion value derivation in an image processing method according to an embodiment of the presently disclosed subject matter. The density measurement value conversion value shows a conversion relationship between the density measurement value (first density measurement value) of a test image for density measurement (illustrated with a reference numeral of "300" in FIG. 7A) after a first processing based on a first processing condition is performed and before a second processing based on a second processing condition is performed, and the density measurement value (second density measurement value) of a test image for density measurement (illustrated with a reference numeral of "310" in FIG. 7B) after the second processing based on the second processing condition is performed.

In the following explanation, a transportation of a recording medium in a short period, which is performed after drawing and before drying fixation processing, is applied as the first processing, and the drying fixation processing is applied as the second processing. That is, the density measurement value conversion value shows the conversion relationship of the density measurement values before and after the drying fixation, and a conversion processing using the density measurement value conversion value is processing to change the density measurement value of an image before the drying fixation into the density measurement value after the drying fixation.

When the derivation of the density measurement value conversion value is started (step S10), a test image for density measurement is formed on the basis of image data to which unevenness correction processing is applied using a preset unevenness correction value (the latest unevenness correction value updated at the end (first unevenness correction value)) (step S12: test image for density measurement formation step).

The test image for density measurement formed in step S12 is transported to the readout position of an image sensor (imaging element) that reads out the test image for density measurement (step S14: transportation step (first processing step)). The transportation of this test image for density measurement (first processing based on the first condition) is performed in a very short period.

That is, the test image for density measurement after the transportation step (at the time of readout by the image sensor) is in a state before drying fixation.

Afterward, the test image for density measurement before the drying fixation is read out using the image sensor (step S16: pre-processing readout step). Here, the image sensor may be an inline sensor included in an image formation device that forms the test image for density measurement, or a scanner that is installed separately from the image formation device.

Next, the density measurement value of the test image for density measurement before the drying fixation (the first density measurement value) is acquired from an output signal (readout result) of the image sensor (step S18: pre-processing density measurement value acquisition step (first density measurement value acquisition step)). When the density of the image is high, the incident light quantity of the image sensor becomes small and the output signal of the image sensor shows a small value.

Meanwhile, when the density of the image is lower, the incident light quantity of the image sensor becomes larger and the output signal of the image sensor shows a higher value. Therefore, the magnitude correlation of the output signal of the image sensor is reversed and set as the density measurement value. In step S18, the density measurement value is acquired for every density setting value (which is described later in detail).

Next, drying fixation processing (second processing based on a second processing condition) is applied to the test image for density measurement before the drying fixation (the test image for density measurement read out using the image sensor in step S18) (step S20: processing step (second processing step)).

Here, as drying fixation processing, transportation of a long period up to until the test image for density measurement gets in a drying fixation state may be applied.

Afterward, using the image sensor in which the test image for density measurement before the drying fixation is read out, a test image for density measurement after the drying fixation processing is read out (step S22: post-processing readout step), and, by reversing the output signal of the image sensor, the density measurement value of the test image for density measurement after the drying fixation (second density measurement value) is acquired (step S24: post-processing density measurement value acquisition step (second density measurement value acquisition step)).

In step S24, similar to step S18, the density measurement value is acquired for every density setting value (which is described later in detail).

Thus, when the density measurement value of each density setting value before and after the drying fixation is acquired, a density measurement value conversion value showing a conversion relationship between the density measurement value before drying fixation and the density measurement value after the drying fixation is derived (step S26: density measurement value conversion value derivation step), and the derivation of the density measurement value conversion value is ended (step S28).

The density measurement value conversion value derived in step S26 is stored in a predefined storage unit (a density measurement value conversion value storage unit illustrated with a reference numeral of "128" in FIG. 4) as a functional form using the density setting value (unevenness correction value used when forming the test image for density measurement) as a variable or a table form using the density setting value as an index, and it is read out and used when the unevenness correction value is derived (changed or updated).

[Explanation of Unevenness Correction Value Derivation]

FIG. 2 is a flowchart illustrating a flow of unevenness correction value derivation in an image processing method according to an embodiment of the presently disclosed subject matter. A case is explained below where a density measurement value conversion value is already derived and, in a state in which an unevenness correction value is set, the set unevenness correction value is updated to a new unevenness correction value.

In the following explanation, the same reference numerals are assigned to parts identical or similar to the previously-described parts, and the explanation is omitted.

When the unevenness correction value derivation is started (step S100), a test image for density unevenness measurement is formed on the basis of image data to which unevenness correction processing is applied using the latest unevenness correction value (second unevenness correction value) (step S102: density unevenness measurement image formation step).

The test image for density unevenness measurement can apply the configuration similar to the previously-described test image for density measurement (illustrated with a reference numeral of "300" in FIG. 7A and a reference numeral of "310" in FIG. 7B) (which is described later in detail).

The test image for density unevenness measurement formed in step S102 is transported to the readout position of the image sensor (step S104: transportation step). Further, the test image for density unevenness measurement before drying fixation is read out using the image sensor (step S106: readout step), and the density measurement value before conversion (pre-conversion density measurement value (third density measurement value)) is acquired (step S108: pre-conversion density measurement value acquisition step (third density measurement value acquisition step)). In step S108, the pre-conversion density measurement value is acquired for every nozzle and every density setting value.

Next, using the already-derived density measurement value conversion value, the pre-conversion density measurement value is converted into a post-conversion density measurement value (post-conversion density measurement value (fourth density measurement value)) equivalent to the density measurement value after the fixation drying for every nozzle and every density setting value (step S110: density measurement value conversion step (fourth density measurement value acquisition step)).

When the post-conversion density measurement value for every nozzle and every density setting value is derived in step S110, a new unevenness correction value (third unevenness correction value) is derived from the post-conversion density measurement value (step S112: unevenness correction value derivation step), and the unevenness correction value derivation is ended (step S114).

The unevenness correction value derived in step S112 is stored in a predefined storage unit (an unevenness correction value storage unit illustrated with a reference numeral of "130" in FIG. 4).

When the new unevenness correction value (third unevenness correction value) is derived, unevenness correction processing to which the new unevenness correction value is applied is performed. Here, when the new unevenness correction value is derived, the unevenness correction value that has been used up to now may be rewritten or the new unevenness correction value may be stored while leaving the unevenness correction value that has been used up to now.

Figure 3:
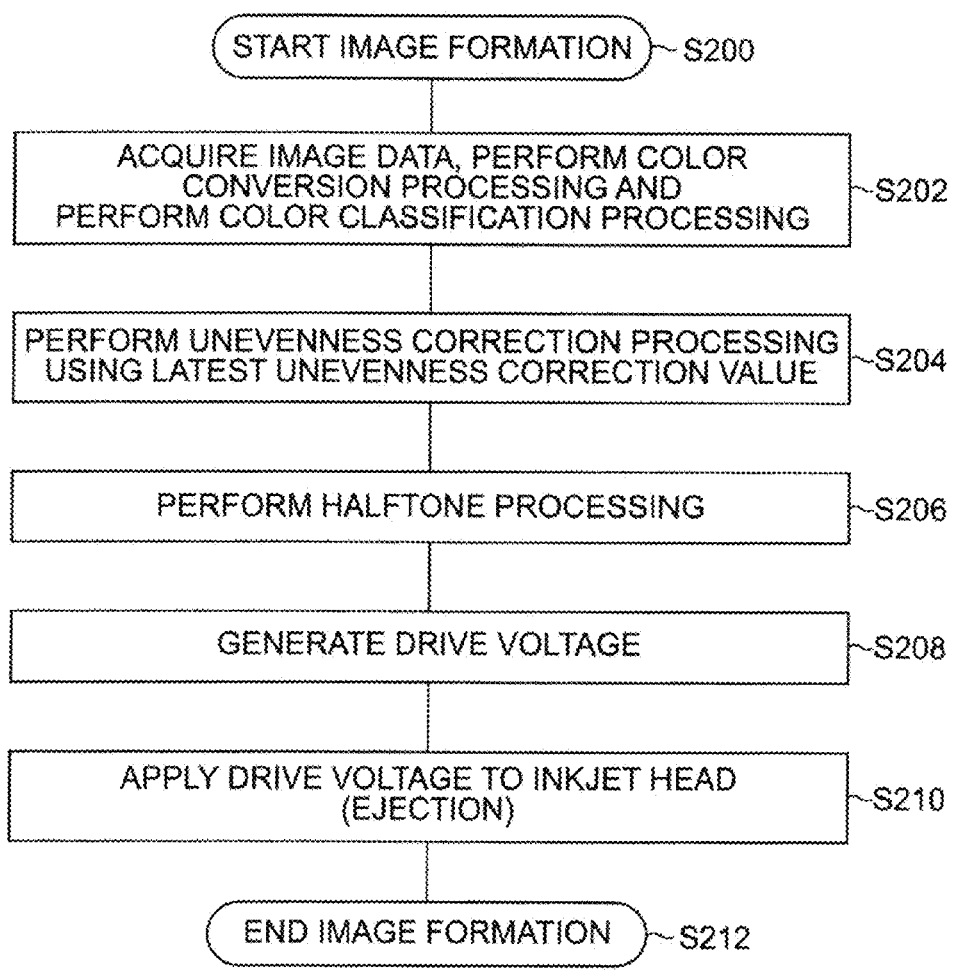
FIG. 3 is a flowchart illustrating a flow of an image formation method including unevenness correction processing to which an unevenness correction value after derivation (update) is applied.

FIG. 3 is a flowchart illustrating a flow of an image formation method including unevenness correction processing.

When image formation is started (step S200), image data (for example, digital-form raster data in which the density value is shown by 0 to 255) is acquired (step S202: image data acquisition step), color conversion processing is applied to the acquired image data (step S202: color conversion processing step) and color separation (classification) processing is applied (step S202: color separation (classification) step).

Unevenness correction processing is applied to each color image data formed as above by the use of the latest unevenness correction value (third unevenness correction value) (step S204: unevenness correction processing step), half tone processing is applied to the image data after the unevenness correction processing (step S206: half tone processing step), and dot data of each color (data illustrating the density setting value of each pixel forming the image (gradation value)) is formed.

Next, the drive voltage of each color (each inkjet head) is generated from the dot data of each color (step S208: drive voltage generation step), the generated drive voltage is applied to the inkjet head, ink is dropped from the inkjet head (step S210: drop step), and the image formation step is ended (step S212).

The image processing method described above can be formed as a program that causes a computer to execute the steps, and it is possible to form a storage medium (storage medium in which transitory reading and writing are not possible) that stores the program.

[Explanation of Image Processing Device (Image Formation Device)]

Next, a device configuration that embodies an image processing method using FIGS. 1 to 3 is described. FIG. 4 is a block diagram illustrating a schematic configuration of an image processing device (image formation device) to which the image processing method according to the presently disclosed subject matter is applied.

An inkjet recording device (image formation device) 100 illustrated in the figure includes an image data input unit 104 in which image data 102 is input, and an image processing unit 106 that applies image processing to the input image data.

The image processing unit 106 (image processing device) generates dot data on the basis of image data (for example, raster data of the digital format), and generates drop data of each nozzle.

That is, the image processing unit 106 includes a color conversion processing unit (not illustrated) that converts image data shown by RGB (red, green and blue) into image data shown by CMKY corresponding to ink colors, a color separation (classification) processing unit (not illustrated) that separates multi-tone image data shown by CMKY into the multi-tone image data of each color, an unevenness correction processing unit 108 that applies unevenness correction processing to the multi-tone image data of each color by the use of an unevenness correction value, and a half tone processing unit 110 that applies half tone processing to the multi-tone image data of each color after the unevenness correction processing.

At the time of the unevenness correction processing, the latest unevenness correction value that is generated in an unevenness correction value generation unit 120 and stored in an unevenness correction value storage unit 130 is applied.

The unevenness correction value generation unit 120 is formed including a density measurement value acquisition unit 122 that acquires a density measurement value, a density measurement value storage unit 124 that stores the acquired density measurement value, a calculation processing unit 126 (density measurement value conversion unit and density measurement value conversion value derivation unit) that derives (calculates) the density measurement value conversion value described using FIG. 1, performs conversion processing from the pre-conversion density measurement value described using FIG. 2 into the post-conversion density measurement value and derives an unevenness correction value, a density measurement value conversion value storage unit 128 that stores the density measurement value conversion value, and an unevenness correction value storage unit 130 that stores the unevenness correction value.

Moreover, the inkjet recording device 100 includes an image formation unit 150 that forms an image based on input image data in a recording medium 140. The image formation unit 150 is formed including a drawing unit 152 (image formation unit) including an inkjet head (which is not illustrated in FIG. 4 and which is illustrated with a reference numeral of "200" in FIG. 5), a transportation unit 154 that transports the recording medium 140 after drawing to a scanner readout position, a scanner 156 (readout unit) that reads out the image formed in the recording medium 140, a drying fixation unit 158 (processing unit) that applies drying processing and fixing processing to the image after the readout processing by the scanner 156, and an discharge unit 160 that discharges the recording medium 140 subjected to the drying processing and the fixing processing.

The drawing unit 152 includes the inkjet head corresponding to each color of KCMY, and a recording medium transportation unit (not illustrated) that holds and transports the recording medium 140.

Moreover, the drawing unit 152 includes a drive voltage generation unit that generates a drive voltage supplied to the inkjet head. The drive voltage generation unit includes a drive waveform generation (storage) unit that generates (stores) a drive waveform, and an amplification unit (output circuit) that applies voltage amplification and current amplification to the drive waveform (the illustration is omitted).

The transportation unit 154 transports the recording medium 140 (recording medium immediately after drawing) output from the drawing unit 152 to the readout position of the scanner 156. In the present example, the recording medium transportation unit that transports the recording medium 140 of the drawing unit 152 and the scanner 156 is used in a combined manner. That is, the transportation unit 154 is also used as a recording medium transportation unit that transports the recording medium 140 from the drawing unit 152 to the scanner 156, and the transportation of the recording medium 140 by the transportation unit 154 is performed in a short period to the extent that the drying and fixing of an image formed on the recording medium 140 do not progress.

The scanner 156 is formed including an image sensor that reads out the image formed on the recording medium 140. The image sensor may be a line sensor or an area sensor.

The drying fixation unit 158 dries the image formed on the recording medium 140 by ventilation and heating, and so on, fixes the image to the recording medium 140 by heating and pressurization, and so on.

The recording medium 140 to which the drying processing and the fixing processing are applied by the drying fixation unit 158 is discharged from the discharge unit 160 to the outside of the device.

[Explanation of Inkjet Head]

FIG. 5 is a plan view illustrating a schematic configuration of the inkjet head included in the drawing unit 152. The drawing unit 152 illustrated in FIG. 4 includes four inkjet heads corresponding to respective colors of KCMY. Since the configurations of four inkjet heads are common, a reference numeral of "200" is assigned without distinguishing four inkjet heads.

An inkjet head 200 illustrated in FIG. 5 has a structure in which a plurality of head modules 202 are connected with respect to the width direction (X direction) of the recording medium 140 orthogonal to the relative transportation direction (which may be simply described as "recording medium transportation direction" or "Y direction" below) of the recording medium 140 with reference to the inkjet head 200.

The branch number (which is an integer assigned after "-" (hyphen)) assigned to the head module 202 shows the i-th (which is an integer from 1 to n) head module.

In an ink ejection surface 204 of each head module 202, a plurality of nozzle openings (which are not illustrated in FIG. 5 and which are illustrated with a reference numeral of "212" in FIG. 6) are arranged.

That is, the inkjet head 200 illustrated in FIG. 5 is a full-line-type inkjet head in which the plurality of nozzle openings are arranged over the length corresponding to full width $L_{max}$ of the recording medium 140 (single-pass page-wide head).

Here, "full width $L_{max}$ of paper P" is the entire length of the recording medium 140 in the X direction orthogonal to the recording medium transportation direction (Y direction). Here, the term "orthogonal" includes a mode to provide an operational effect similar to a case where the intersection forms an angle of substantially 90°, among modes in which the intersection forms an angle of less than 90° or an angle greater than 90°.

FIG. 6 is a plan perspective view of the nozzle surface in the head module 202 illustrated in FIG. 5. The head module 202 shown in FIG. 6 is a planar shape of a parallelogram having the end surface on the long-side side along the V direction with a slope of angle β with respect to the X direction and the end surface on the narrow-side side along the W direction with a slope of angle α with respect to the Y direction, and the plurality of nozzle openings 212 are arranged in the row direction along the V direction and the column direction along the W direction.

Here, the arrangement of the nozzle openings 212 are not limited to the mode illustrated in FIG. 6, and the plurality of nozzle openings 212 may be arranged along the row direction along the X direction and the column direction that diagonally intersects with the X direction.

As for the head module 202 in which the nozzle openings 212 are arranged in a matrix manner, taking into account a nozzle column projected such that the nozzle openings 212 are arranged in the X direction, it is equivalent to a structure in which the nozzle openings 212 are arranged at regular intervals in the X direction and the arrangement interval of the nozzle openings 212 is the minimum value of dot intervals in the X direction.

That is, the X direction is a nozzle arrangement direction in a projection nozzle column projected such that the nozzle openings 212 are arranged in the X direction. In the following explanation, the X direction may be described as "nozzle arrangement direction".

Although illustration is omitted, the inkjet head 200 (the head module 202) includes a pressure chamber (liquid chamber) connected with the nozzle openings 212 and a supply flow path connected with the pressure chamber through a supply port (supply throttle). When ink is ejected from the nozzle openings 212, the ink is supplied from the supply flow path to the pressure chamber through the supply port.

The drop system of the inkjet head 200 may apply the piezoelectric system using the deflection of a piezoelectric element or apply the thermal system using an ink film boiling phenomenon. In the piezoelectric system, when the drive voltage is applied to the piezoelectric element, the volume of the pressure chamber decreases according to the deflection of the piezoelectric element and ink corresponding to the volume decrease of the pressure chamber is dropped (ejected) from the nozzle openings 212.

Meanwhile, in the thermal system, air bubbles are generated by heating ink in the pressure chamber, and ink corresponding to the volume of the pressure chamber is dropped from the nozzle openings 212.

The image formation device illustrated in FIG. 4 can be assumed to be an image processing device to which a part of the configuration is applied. The image processing unit 106 in FIG. 4 can be formed as a single device and can form the image formation device in combination with the image formation unit 150.

[Detailed Explanation of Density Measurement Value Conversion Value]

Figure 7A:
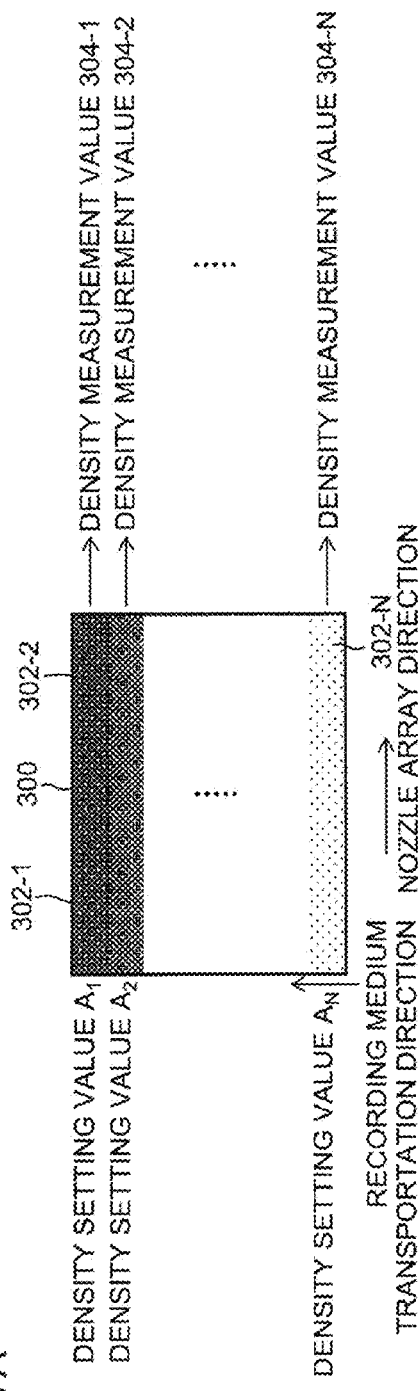
FIG. 7A is an explanatory diagram of the first density measurement value.
Figure 7B:
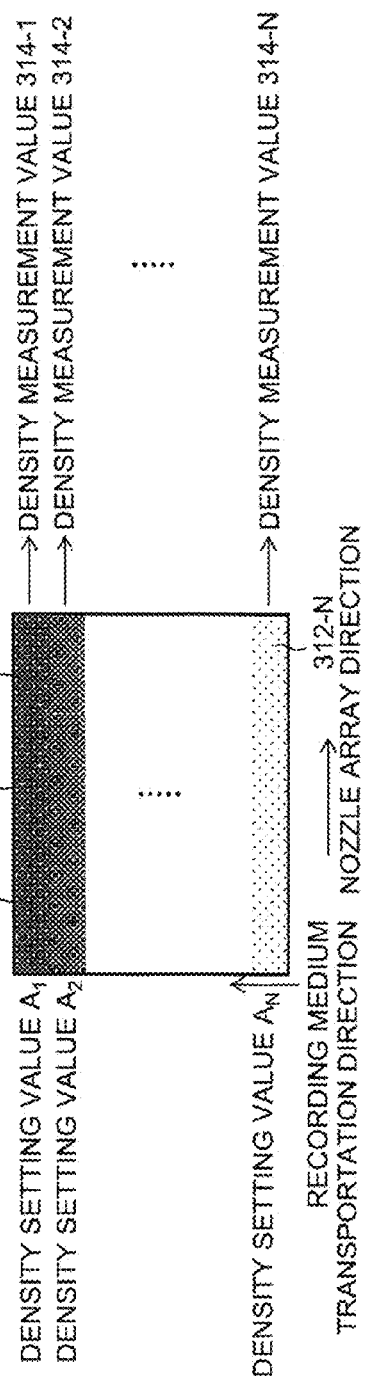
FIG. 7B is an explanatory diagram of the second density measurement value.

Next, the density measurement value conversion value is described in detail. FIGS. 7A and 7B are explanatory diagrams of the density measurement values before and after drying fixation applied to derive the density conversion value measurement value, where FIG. 7A is an explanatory diagram of the density measurement value before drying fixation and FIG. 7B is an explanatory diagram of the density measurement value after the drying fixation.

The test image for density measurement 300 illustrated in FIG. 7A is formed using the drawing unit 152 on the basis of image data to which unevenness correction processing is applied using the latest unevenness correction value preset by the unevenness correction processing unit 108 illustrated in FIG. 4. Further, the drawn test image for density measurement 300 is transported from the drawing unit 152 to the readout position of the scanner 156 by the transportation unit 154 in FIG. 4.

The test image for density measurement 300 has N (N is a positive integer) belt-like patterns 302 (302-1, 302-2, ..., 302-N) with different density setting values along the nozzle array direction (X direction in FIG. 6), and N belt-like patterns 302-1, 302-2, ..., 302-N are arranged along the recording medium transportation direction (Y direction in FIG. 6).

Pattern 302-1 corresponds to density setting value $A_1$, pattern 302-2 corresponding to density setting value $A_2$ and 302-N corresponds to density setting value $A_N$.

In the test image for density measurement 300 illustrated in FIG. 7A, the density setting value becomes smaller from the top to the bottom in the figure. That is, the density setting values of N belt-line patterns 302-1, 302-2, ..., 302-N have the relationships of density setting value $A_1$>density setting value $A_2$> ... >density setting value $A_N$.

The test image for density measurement 300 is read out using the scanner 156 in FIG. 4, and, based on the readout data of the scanner 156, N density measurement values 304-1 to 304-N before drying fixation respectively corresponding to patterns 302-1 to 302-N are acquired.

When one pattern 302 is read out, since a plurality of readout data values corresponding to the element number in the nozzle array direction are acquired, the average value of these plurality of readout data values is assumed as the density measurement value per pattern (density setting value).

The density measurement value before drying fixation for every density setting value acquired from the readout result of the test image for density measurement 300 before the drying fixation is stored in the density measurement value storage unit 124 through the density measurement value acquisition unit 122 in FIG. 4.

The test image for density measurement 310 after the drying fixation illustrated in FIG. 7B is acquired by applying the drying fixation processing to the test image for density measurement 300 before the drying fixation illustrated in FIG. 7A. The test image for density measurement 310 after the drying fixation is read out using the scanner 156 in FIG. 4, and, based on the readout data of the scanner 156, N density measurement values 314-1 to 314-N after the drying fixation respectively corresponding to patterns 312-1 to 312-N are acquired.

When one pattern 312 is read out, since a plurality of readout data values corresponding to the element number in the nozzle array direction are acquired, the average value of these plurality of readout data values is assumed as the density measurement value per pattern (density setting value).

Here, density measurement values 304 and 314 for every pattern may be the minimum value and maximum value of the plurality of readout data values acquired for every pattern.

Figure 8A:
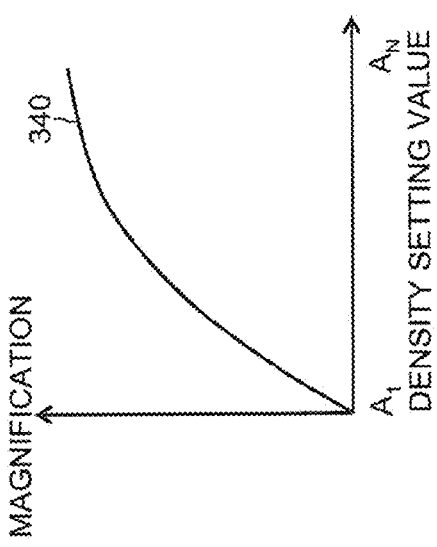
FIGS. 8A and 8B are explanatory diagrams of a density measurement value conversion value.
Figure 8B:
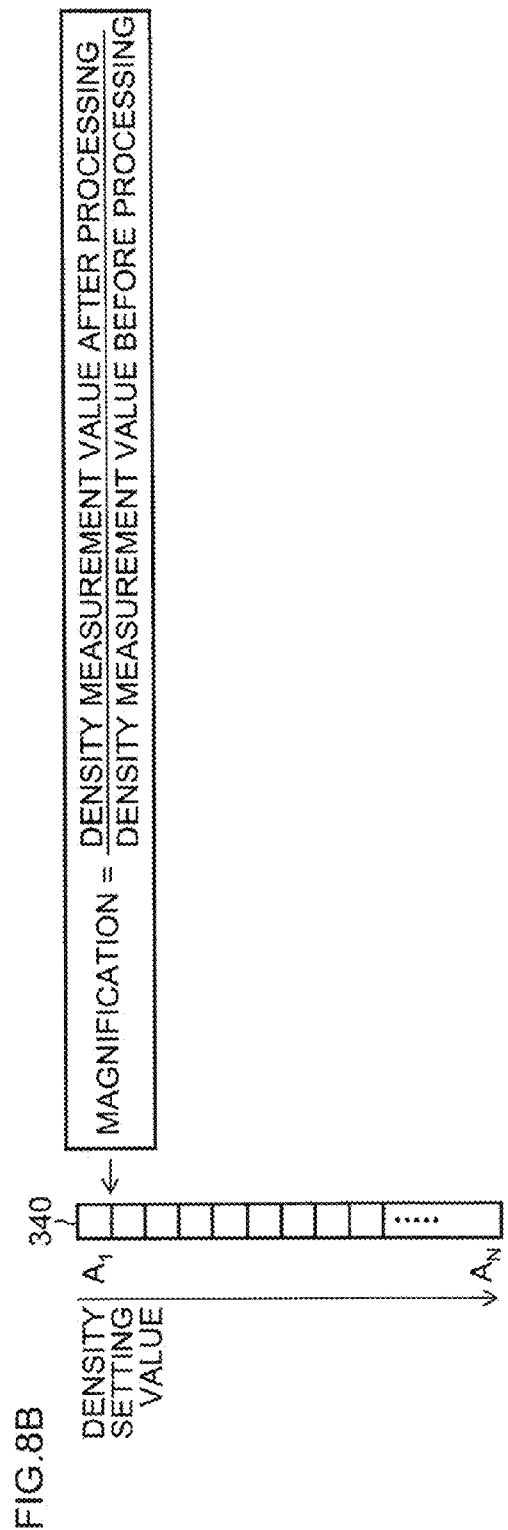

FIGS. 8A and 8B are explanatory diagrams of the density measurement value conversion value. As illustrated in FIGS. 8A and 8B, a density measurement value conversion value 340 is assumed to be a magnification of the density measurement value after the drying fixation with respect to the density measurement value before drying fixation for every density setting value.

That is, magnification=(density measurement value before drying fixation)/(density measurement value after drying fixation) is calculated for every density setting value, the density measurement value conversion value 340 is stored in the density measurement value storage unit 124 in FIG. 4 as a function (linear function) using the density setting value (the unevenness correction value applied when the test image for density measurement is generated) as a parameter or as a table (one-dimensional table) using the density setting value as an index. Here, it is also possible to assume the density measurement value conversion value of each density setting value as the two-dimensional table format of each nozzle.

[Explanation of Relationship Between Unevenness Correction Value and Ink Amount]

The unevenness correction value is equivalent to the ink amount distribution correction value to correct the distribution of the ink amount in the nozzle array direction. In the unevenness correction process, in a case where the ejection amount of a certain nozzle is too small (or too large), an essential ejection amount is realized by increasing (decreasing) the ejection amount of the nozzle.

Figure 9A:
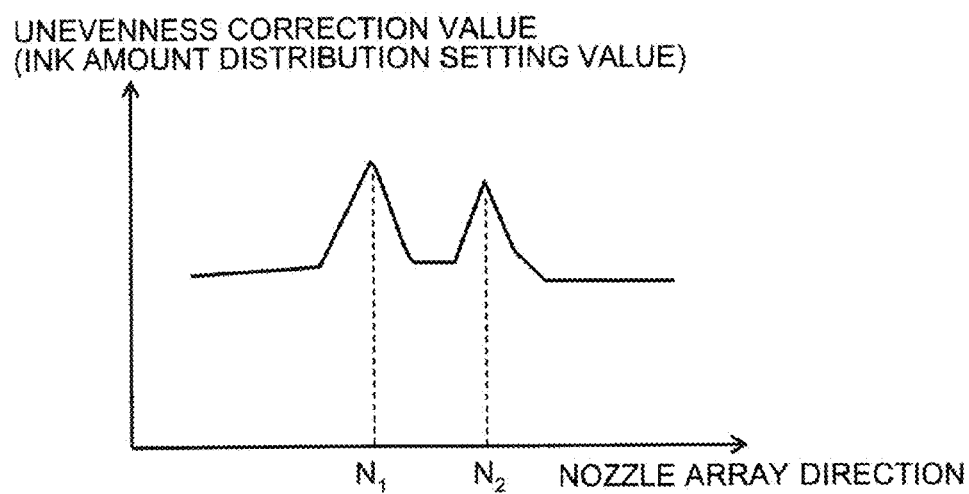
FIG. 9A is an explanatory diagram schematically illustrating an unevenness correction value.
Figure 9B:
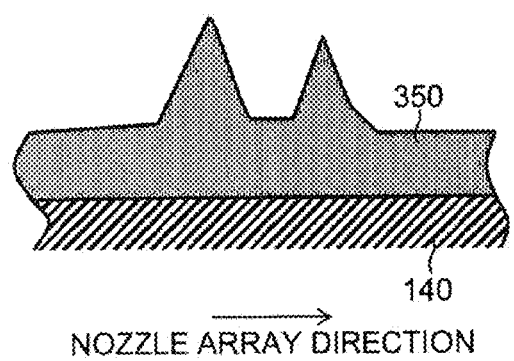
FIG. 9B is an explanatory diagram schematically illustrating a relationship between the unevenness correction value and an ink amount.

That is, as illustrated in FIG. 9A, unevenness correction processing is equivalent to processing to increase the ink amount by enlarging the density setting value with respect to nozzles ($N_1$, $N_2$) with too small ejection amounts (see FIG. 9B). FIG. 9B illustrates a state where ink 350 is locally increased in positions corresponding to nozzles $N_1$ and $N_2$.

When the ejection state of each nozzle varies and the relationship between the unevenness correction value and the ejection characteristic of each nozzle (recording characteristic) becomes unsuitable, a black pattern may be generated in the positions (the positions corresponding to nozzles $N_1$ and $N_2$ in FIG. 9A) corresponding to the nozzles in which the ink amount is increased. Therefore, a density unevenness measurement test image to which unevenness correction processing is applied using a preset unevenness correction value is formed, density unevenness is measured using this density unevenness measurement test image, and the unevenness correction value is changed (updated) on the basis of the measured density unevenness.

When the unevenness correction value is arbitrarily changed (updated) according to the nozzle ejection state, unevenness correction processing reflecting the ejection state of each nozzle at the time of image formation is realized, and the generation of density unevenness due to the ejection characteristic of each nozzle is suppressed.

Figure 10A:
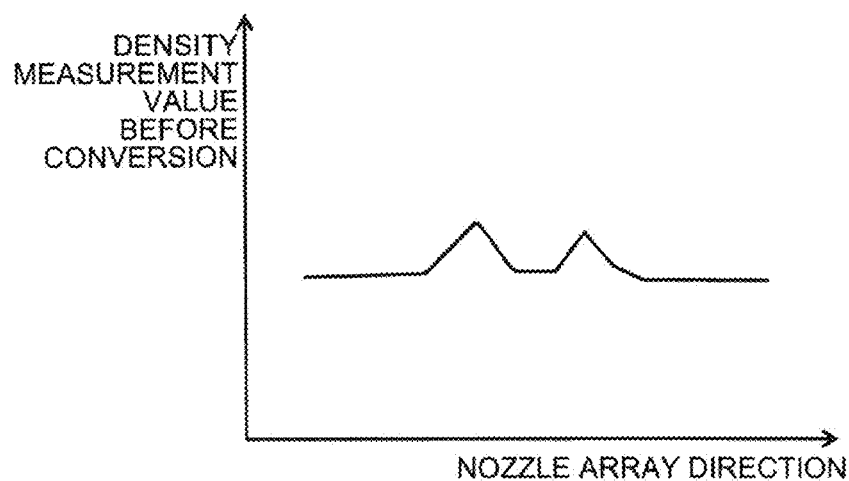
FIG. 10A is an explanatory diagram of the density measurement value before conversion.
Figure 10B:
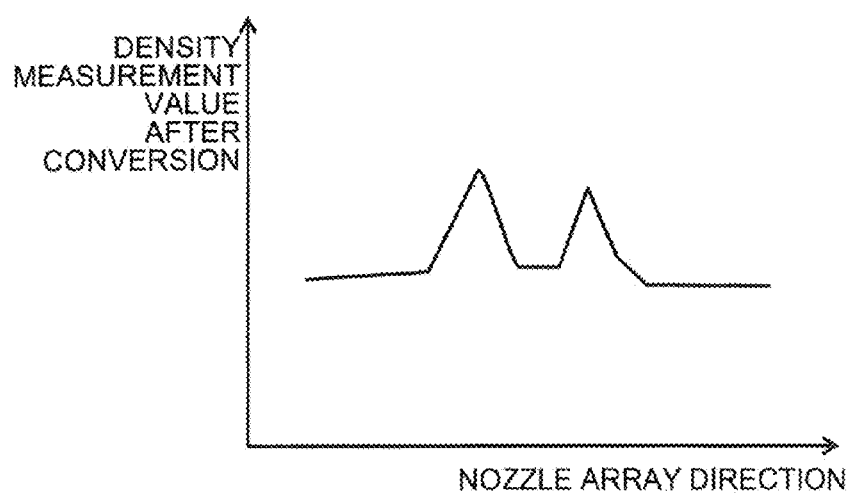
FIG. 10B is an explanatory diagram of the density measurement value after conversion.

FIG. 10A is an explanatory diagram schematically illustrating the density measurement value before conversion (density measurement value before fixation drying) acquired in step S108 of FIG. 2, and FIG. 10B illustrates the density measurement value after conversion converted in step S110 of FIG. 2.

As for the density measurement value before conversion illustrated in FIG. 10A, in consequence of the optical reflection characteristic on the ink surface, a small change in the increase (black pattern) part of the ink amount, which is caused by an error in the unevenness correction processing or aging variation of the ink ejection amount, is measured. Then, the unevenness correction value derived using the density measurement value before conversion does not appropriately reflect real density unevenness.

The density measurement value after conversion illustrated in FIG. 10B adequately reflects the increase of the ink amount by the unevenness correction processing. That is, even in a configuration to perform density measurement immediately after drawing, by converting the density measurement value before conversion that is an actual density measurement value into the density measurement value after conversion and deriving the unevenness correction value by the use of the density measurement value after conversion, the unevenness correction value appropriately reflecting the real density unevenness is derived.

Figure 11:
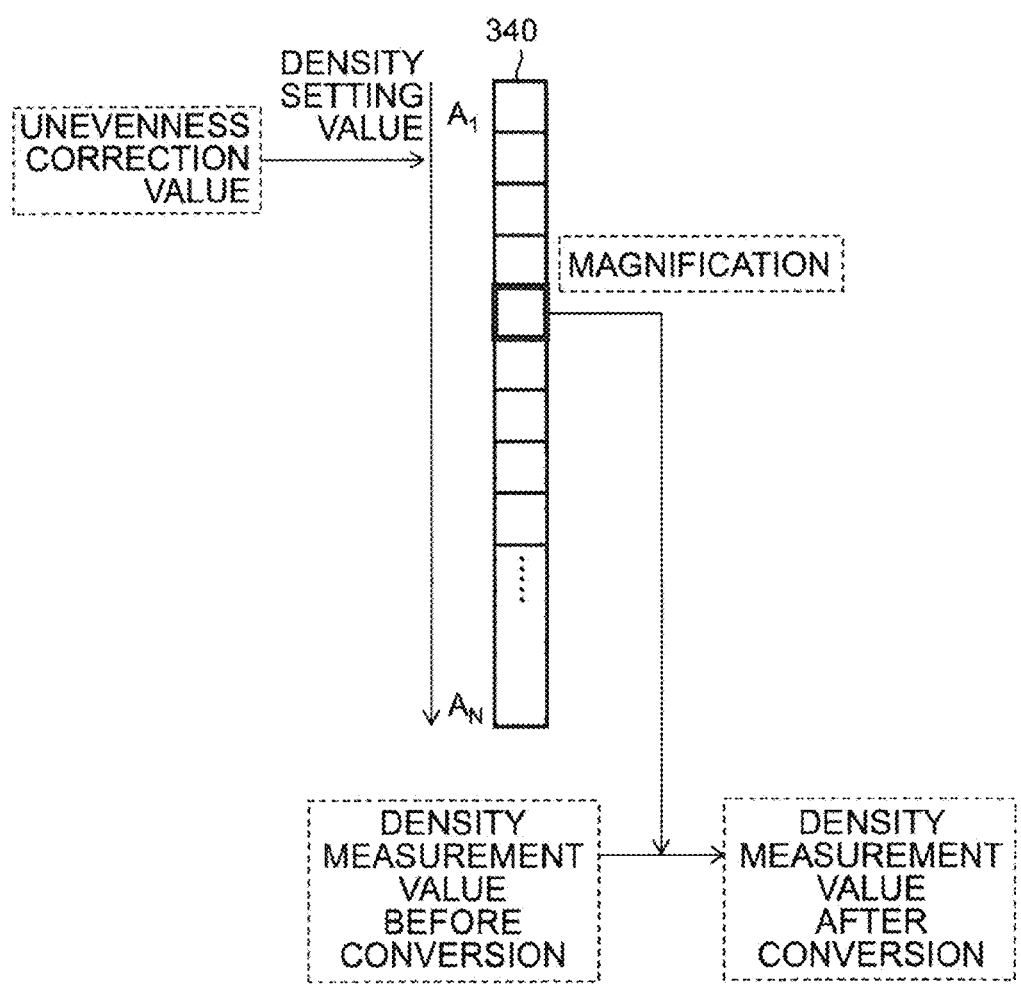
FIG. 11 is an explanatory diagram of a calculation to which the density measurement value conversion value is applied.

FIG. 11 is an explanatory diagram of calculation to which the density measurement value conversion value is applied. As illustrated in FIG. 11, the density measurement value conversion value 340 is a magnification of the density measurement values before and after drying fixation in density setting values $A_1$ to $A_N$.

From the readout result of the density unevenness measurement test image, the density measurement value (density measurement value before conversion) of the image before the drying fixation immediately after drawing is acquired for every nozzle and every density setting value, the value of an unevenness correction value applied when the density unevenness measurement test image is formed is input as density setting values $A_1$ to $A_N$ of the density measurement value before conversion, and the density measurement value conversion value corresponding to the input value is acquired.

The acquired density measurement value conversion value is multiplied by the density measurement value before conversion to derive the density measurement value after conversion (the value equivalent to the density measurement value after the drying fixation of the density unevenness measurement test image).

The density measurement value after conversion is derived for every nozzle and every density setting value, and, based on these values, a new unevenness correction value is derived.

Here, it is possible to apply a known technique (see Japanese Patent Application Laid-Open No. 2006-347164) as a technique of deriving the unevenness correction value from the density unevenness measurement value, and it is not limited to a specific technique.

The "unevenness correction value" shown in the present example corresponds to the "density correction coefficient" described in the above-mentioned patent literature. The "unevenness correction value" may be referred to as "unevenness correction coefficient (function)" or "density correction coefficient (function)".

[Transforming Example of Density Unevenness Measurement Test Image]

Figure 12A:
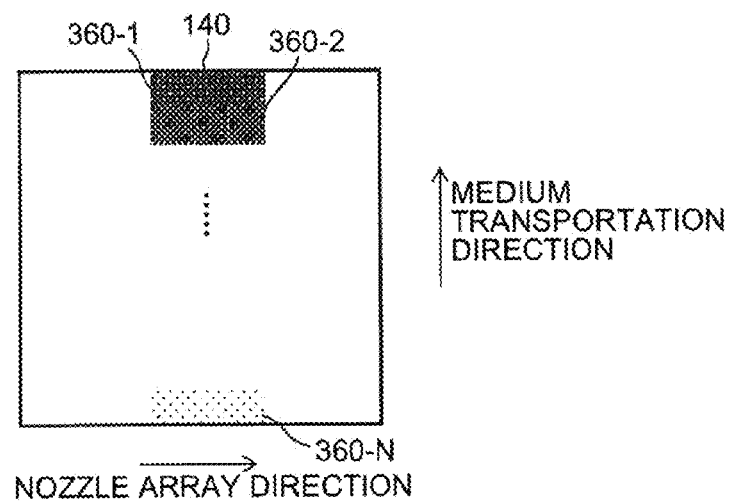
FIGS. 12A-12B are explanatory diagrams of another mode of a test image for density measurement.
Figure 12B:
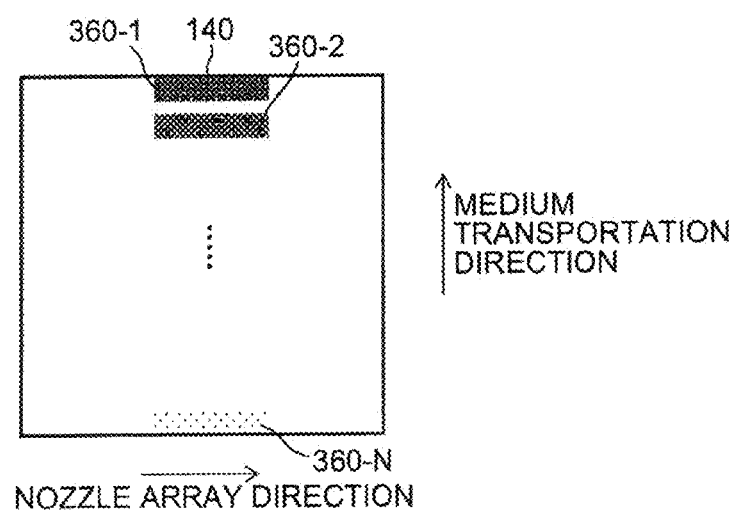

FIGS. 12A and 12B are explanatory diagrams illustrating other modes of the density unevenness measurement test image. Here, in FIGS. 12A and 12B, the same reference numerals are assigned to the same/similar parts as/to FIGS. 7A and 7B, and the explanation is omitted.

Patterns 360-1 to 360-N forming the density unevenness measurement image illustrated in FIG. 12A may be formed with only part of the recording medium 140 by the use of a partial nozzle. Moreover, as illustrated in FIG. 12B, patterns 360-1 to 360-N with different density setting values may be separated to form it.

In FIG. 12A, although a density unevenness measurement test image 300 is formed in the central part in the nozzle array direction of the recording medium 140, the density unevenness measurement test image 300 may be formed in other positions than the central part in the nozzle array direction such as an edge part in the nozzle array direction of the recording medium 140.

[Explanation of Effects]

According to the image processing method and device formed as above, the density measurement value conversion value indicating the conversion relationship between the density measurement value before drying fixation immediately after drawing and the density measurement value after drying fixation is derived beforehand. The density measurement value before conversion acquired from the readout result of the density unevenness measurement test image before drying fixation is converted into the density measurement value after conversion which is equivalent to the density measurement value after drying fixation. The unevenness correction value is derived on the basis of the density measurement value after conversion. Therefore it is possible to derive the unevenness correction value taking into account the density change before and after the drying fixation, by the use of the density measurement value of the drying fixation.

Since the optical reflection characteristic on the dot (ink) surface changes before and after the drying fixation, to understand this optical reflection characteristic change is useful for a case where the density measurement value before drying fixation is used.

Since the test image for density measurement to which unevenness correction processing using an unevenness correction value is applied is formed when the density measurement value conversion value is derived, the density measurement value conversion value taking into account the unevenness correction value is derived.

In a case where the density measurement value before drying fixation is used, there is a possibility that an increase of the ink amount (generation of a black pattern), which is caused by an error in the unevenness correction processing or aging variation of the ink ejection amount, is not reflected to the density measurement value. Therefore, the density measurement value conversion value is read out using the unevenness correction value (ink amount distribution correction value in the nozzle array direction) indicating the increase and decrease of the ink amount as an index. And, using the read density measurement value conversion value, the density measurement value before fixation drying is converted into the density measurement value equivalent to the density measurement value after fixation drying.

[Application Example to Another Device Configuration]

Figure 13:
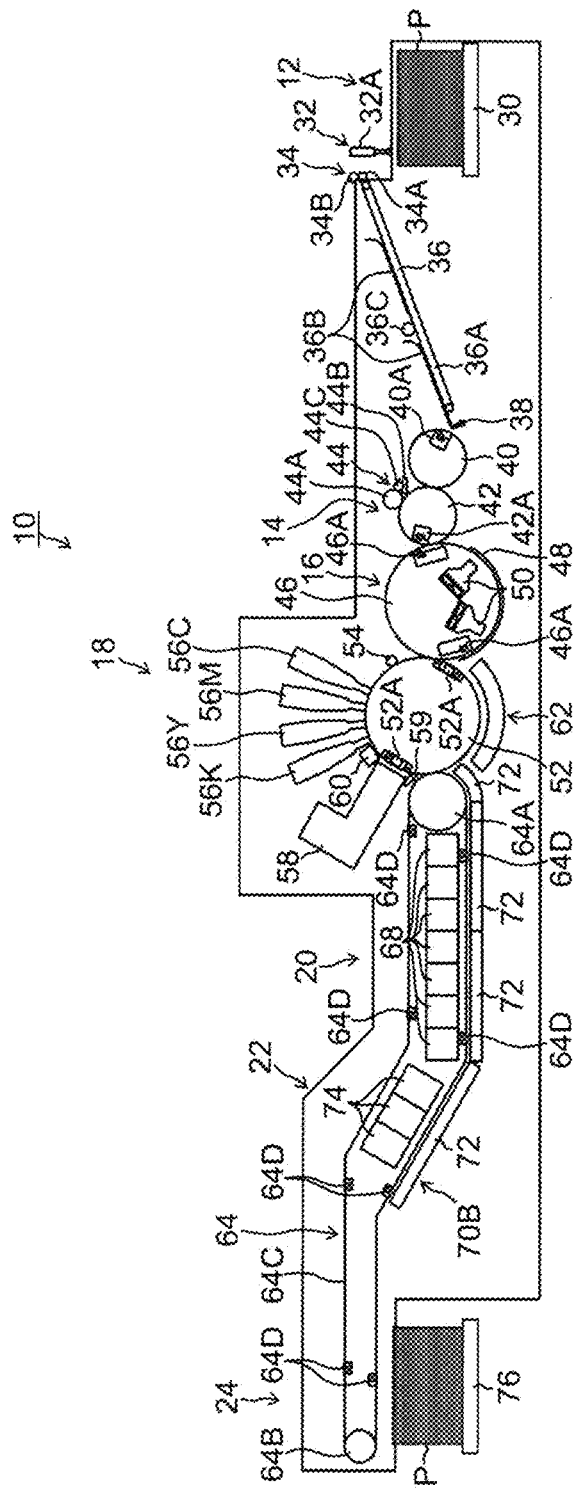
FIG. 13 is a whole configuration diagram of an image formation device according to an embodiment of the presently disclosed subject matter.

Next, another device configuration to which the above-mentioned image processing method and image processing device are applied is described. FIG. 13 is the whole configuration diagram of an inkjet recording device according to another device configuration.

An inkjet recording device 10 illustrated in the figure is an inkjet recording device that records an image in an inkjet printing system using an aqueous UV ink (UV (ultraviolet) curable ink using an aqueous medium) for sheet paper P.

The inkjet recording device 10 includes: a paper feed unit 12 that feeds paper P; a process liquid assignment unit 14 that assigns a process liquid to the front surface of paper P fed from the paper feed unit 12; a process liquid drying processing unit 16 that performs drying processing of paper P to which the process liquid is assigned in the process liquid assignment unit 14; an image formation unit 18 that records an image in an inkjet system using a an aqueous UV (ultraviolet) ink for the front surface of paper P to which the drying processing is applied in the process liquid drying processing unit 16; an ink drying processing unit 20 that performs drying processing of paper P in which the image is recorded in the image formation unit 18; a UV irradiation processing unit 22 that fixes the image by irradiating UV light (active ray) to paper P on which the drying processing is performed in the ink drying processing unit 20; and a paper ejection unit 24 that ejects paper P on which the UV irradiation processing is performed in the UV irradiation processing unit 22.

<Paper Feed Unit>

The paper feed unit 12 includes a paper feed tray 30, a sucker device 32, a paper feed roller pair 34, a feeder board 36, a front pad 38 and a paper feed drum 40, and feeds paper P loaded on the paper feed tray 30 one by one to the process liquid assignment unit 14.

Paper P loaded on the paper feed tray 30 is pulled out one by one in order from the top by the sucker device 32 (suction fit 32A) and fed to the paper feed roller pair 34 (between a top and bottom pair of rollers 34A and 34B).

Paper P fed to the paper feed roller pair 34 is sent forward by the top and bottom pair of rollers 34A and 34B, and placed on the feeder board 36. Paper P placed on the feeder board 36 is transported by a tape feeder 36A installed on the transportation surface of the feeder board 36.

Further, in the transportation process, it is pressed against the transportation surface of the feeder board 36 by a retainer 36B and a guide roller 36C, and the convexity and concavity are corrected. As for paper P transported by the feeder board 36, when the edge is contacted to the front pad 38, the slope is corrected, and it is transferred to the paper feed drum 40 afterward. Further, the edge part is gripped by a gripper 40A of the paper feed drum 40 and it is transported to the process liquid assignment unit 14.

<Process Liquid Assignment Unit>

The process liquid assignment unit 14 includes a process liquid assignment drum 42 that transports paper P and a process liquid assignment unit 44 that assigns a predetermined process liquid to the front surface of paper P transported by the process liquid assignment drum 42, and assigns (applies) a process liquid to the front surface of paper P.

As the process liquid applied to the front surface of paper P, a process liquid having a function to condense color materials in an aqueous UV ink deposited on paper P in the image formation unit 18 on the subsequent stage is applied. By applying the process liquid to the front surface of paper P and depositing the aqueous UV ink, it is possible to perform high-quality printing without causing impact interference or the like even if a general-purpose printing paper is used.

Paper P transferred from the paper feed drum 40 of the paper feed unit 12 is transferred to the process liquid assignment drum 42. By gripping (holding) the edge of paper P by the gripper 42A and performing rotation, the process liquid assignment drum 42 winds paper P to the peripheral surface and transports it.

In this transportation process, by pressing and contacting an application roller 44A, to which a process liquid balanced to a constant amount from a process liquid plate 44B by an anilox roller 44C is applied, to the front surface of paper P, the process liquid is applied to the front surface of paper P. Here, the mode to apply the process liquid is not limited to the roller application, and it is also possible to apply other modes such as application by an inkjet system or a blade.

<Process Liquid Drying Processing Unit>

The process liquid drying processing unit 16 includes: a process liquid drying processing drum 46 that transforms paper P; a paper transportation guide 48 that supports (guides) the back surface of paper P; and a process liquid drying processing unit 50 that blows the hot wind to the front surface of paper P transported by the process liquid drying processing drum 46 and dries it, and applies drying processing to paper P in which the process liquid is assigned to the surface.

As for paper P transferred from the process liquid assignment drum 42 of the process liquid assignment unit 14 to the process liquid drying processing drum 46, the front edge thereof is gripped by a gripper 46A included in the process liquid drying processing drum 46.

Moreover, as for paper P, the back surface is supported by the paper transportation guide 48 in a state where the front surface (surface to which the process liquid is applied) turns internally. By rotating the process liquid drying processing drum 46 in this state, paper P is transported.

In the transportation process by the process liquid drying processing drum 46, the hot wind blows from the process liquid drying processing unit 50 installed inside the process liquid drying processing drum 46 to the front surface of paper P, drying processing is applied to paper P, the solvent component in the process liquid is removed, and an ink condensing layer is formed on the front surface of paper P.

<Image Formation Unit>

The image formation unit is a component corresponding to the drawing unit 152 in FIG. 4. The image formation unit 18 includes: an image formation drum 52 that transports paper P; a paper press roller 54 that presses paper P transported by the image formation drum 52 and contacts paper P to the peripheral surface of the image formation drum 52; inkjet heads 56C, 56M, 56Y and 56K that respectively eject ink droplets of colors of C, M, Y and K to paper P; an inline sensor 58 that reads out an image recorded in paper P; a mist filter 60 that captures ink mist; and a drum cooling unit 62. The image formation unit 18 deposits an ink (aqueous UV ink) droplet of each color of C, M, Y and K on the front surface of paper P in which a process liquid layer is formed, and draws a color image on the front surface of paper P.

As for the inkjet heads 56C, 56M, 56Y and 56K illustrated in FIG. 13, the inkjet head 200 described using FIG. 5 and FIG. 6 is applied.

Various ejection systems are applicable to the inkjet head applied to the present example, such as the piezoelectric system that ejects ink using the deflection of the piezoelectric element (see FIG. 6), the thermal system that heats ink and causes a film boiling phenomenon to eject the ink, and an electrostatic system that impacts charged ink to a recording medium by electrostatic force.

Moreover, as for the inkjet head applied to the present example, a line type head in which a nozzle is formed over a length corresponding to the full width of paper P (the entire length in a main scanning direction orthogonal to the relative movement direction of paper P) is applied (see FIG. 3).

As for paper P transferred from the process liquid drying processing drum 46 of the process liquid drying processing unit 16 to the image formation drum 52, the front edge is gripped by a gripper 52A included in the image formation drum 52. Further, by causing paper P to pass under the paper press roller 54, paper P contacts to the peripheral surface of the image formation drum 52.

Paper P contacted to the peripheral surface of the image formation drum 52 is adsorbed by the negative pressure generated in an adsorption hole formed on the peripheral surface of the image formation drum 52, and adsorbed and held to the peripheral surface of the image formation drum 52.

When paper P which is adsorbed and held to the peripheral surface of the image formation drum 52 and transported passes through an ink jetting area immediately below each of the inkjet heads 56C, 56M, 56Y and 56K, the ink droplet of each color of C, M, Y and K from each of the inkjet heads 56C, 56M, 56Y and 56K is deposited on the front surface and a color image is drawn on the front surface.

The ink deposited on the surface of paper P reacts to an ink condensing layer formed on the front surface of paper P and is fixed to the front surface of paper P without causing feathering, bleeding or the like, and an image of high quality is formed on the front surface of paper P.

When paper P on which the image is formed by the inkjet heads 56C, 56M, 56Y and 56K passes the readout area of an inline sensor 58, the image formed on the surface is read out.

The inline sensor 58 in FIG. 13 is a component corresponding to the scanner 156 in FIG. 4.

The image readout by the inline sensor 58 is optionally performed, and an image defect (image malfunction) such as an ejection defect and density unevenness is inspected in the image readout data. After the adsorption is released, paper P having passed the readout area of the inline sensor 58 passes under a guide 59 and is transferred to the ink drying processing unit 20.

<Ink Drying Processing Unit>

The ink drying processing unit in FIG. 13 is a component corresponding to the drying fixation unit 158 in FIG. 4.

The ink drying processing unit 20 is formed including an ink drying processing unit 68 that applies drying processing to paper P transported by a chain gripper 64, applies the drying processing to paper P after image formation, and removes the liquid element remaining on the front surface of paper P.

As a configuration example of the ink drying processing unit 68, there is a mode including a heat source such as a halogen heater and an infrared ray (IR) heater, and a fan that blows the air (gas or fluid) heated by the heat source to paper P.

As for paper P transferred from the image formation drum 52 of the image formation unit 18 to the chain gripper 64, the front edge is gripped by a gripper 64D included in the chain gripper 64.

The chain gripper 64 has a structure in which a pair of endless chains 64C is wound around a first sprocket 64A and a second sprocket 64B.

Moreover, the back surface of the rear edge of paper P is adsorbed and held to the paper holding surface of a guide plate 72 arranged apart from the chain gripper 64 by a constant distance.

<UV Irradiation Processing Unit>

The UV irradiation processing unit 22 (active light irradiation device) includes a UV irradiation unit 74, irradiates ultraviolet rays to an image recorded using an aqueous UV ink and fixes the image to the surface of paper P.

As a configuration example of the UV irradiation unit, there is a mode including a UV light source that generates UV light and an optical system functioning as a device that focuses the UV light and a device that deflects the UV light, and so on.

When paper P transported by the chain gripper 64 arrives at a UV light irradiation area of the UV irradiation unit 74, UV irradiation processing is applied by the UV irradiation unit 74 installed inside the chain gripper 64.

That is, paper P, which is transported by the chain gripper 64 and in which the front edge is gripped by the gripper and the back surface of the rear edge is absorbed and held to the paper holding surface, receives the UV light irradiated from the UV irradiation unit 74 arranged in the position corresponding to the front surface of paper P in the transportation path of paper P. An image (ink) to which the UV light is irradiated develops the hardening reaction and is fixed to the front surface of paper P.

Paper P to which the UV irradiation processing is applied is sent to the paper ejection unit 24 via an inclination transportation path 70B. A cooling process unit that applies cooling processing to paper P passing the inclination transportation path 70B may be provided.

<Paper Ejection Unit>

The paper ejection unit 24 that collects paper P on which a series of image formation processing is performed includes a paper ejection table 76 that stacks and collects paper P.

The chain gripper 64 (gripper 64D) releases paper P on the paper ejection table 76 and stacks paper P on the paper ejection table 76. The paper ejection table 76 stacks and collects paper P released from the chain gripper 64. In the paper ejection table 76, an unillustrated paper pad (such as a front paper pad, a rear paper pad and a side paper pad) is provided such that paper P is stacked in an orderly manner.

Moreover, the paper ejection table 76 is installed so as to be able to go up and down by an unillustrated paper ejection table lifting device. The drive of the paper ejection table lifting device is controlled in synchronization with the increase and decrease of paper P stacked on the paper ejection table 76, and the paper ejection table 76 is moved up and down such that paper P located in the top always locates in a constant height.

In the control system of the inkjet recording device 10 in FIG. 13, it is possible to apply the image processing unit 106 in FIG. 4, add components such as a control unit and memory corresponding to each unit of the device, and add a system control unit that collectively controls these.

The image processing method, the image processing device, the image processing program and the image formation device, which have been described above, can be arbitrarily changed, added and deleted without departing from the scope of the presently disclosed subject matter. Moreover, it is also possible to arbitrarily combine the above-mentioned configuration examples.

Although the present specification has exemplified an inkjet recording device as one example of the image formation device, the presently disclosed subject matter is widely applicable to other image formation devices than the inkjet recording device (for example, an image formation device of an electrophotography system).

[Inventions Disclosed in the Present Specification]

As understood from the description of the embodiments of the invention described in detail above, the present specification includes at least the disclosure of various technical ideas including the following inventions.

(First aspect): An image processing method including: a density unevenness measurement test image formation step of forming a density unevenness measurement test image based on image data subjected to unevenness correction processing to correct density unevenness due to a recording characteristic of multiple recording elements included in a recording head, using a preset unevenness correction value; a density measurement value acquisition step of acquiring a pre-conversion density measurement value that is a density measurement value of each density setting value for every recording element in the density unevenness measurement test image before processing after image formation using the recording head; a density measurement value conversion step of converting the acquired pre-conversion density measurement value into a post-conversion density measurement value corresponding to a density measurement value after the processing, using a density measurement value conversion value which is derived beforehand and indicates a conversion relationship of the density measurement values before and after the processing for every density setting value and to which the set unevenness correction value is applied as the density setting value; and an unevenness correction value derivation step of deriving a new unevenness correction value using the post-conversion density measurement value.

According to the first aspect, using the density measurement value conversion value indicating the conversion relationship of the density measurement values before and after the processing, the pre-conversion density measurement value corresponding to the density measurement value before the processing is converted into the post-conversion density measurement value corresponding to the density measurement value after the processing, and the unevenness correction value is derived on the basis of the changed density measurement value. Therefore, the new unevenness correction value is derived taking into account the difference in the density measurement value of the image before and after the processing.

The recording head includes an inkjet head that ejects ink from a nozzle and a recording head in an image device of an electrophotography system, and so on.

The recording element includes a nozzle held in the inkjet head and an LED element held in the recording head in the image device of the electrophotography system.

Another processing (first processing) may be applied before processing (second processing) after the image formation.

(Second aspect): The image processing method described in the first aspect, further including: a test image for density measurement formation step of forming a test image for density measurement using the recording head, based on image data to which unevenness correction processing is applied using the preset unevenness correction value; a pre-processing density measurement value acquisition step of acquiring a density measurement value before the processing for every density setting value in the test image for density measurement before the processing of the formed test image for density measurement; a processing step of applying the processing to the formed test image for density measurement; a post-processing density measurement value acquisition step of acquiring a density measurement value after the processing for every density setting value in the test image for density measurement after the processing step; and a density measurement value conversion value derivation step of deriving the density measurement value conversion value for every density setting value using the set unevenness correction value as the density setting value, based on the pre-processing density measurement value and the post-processing density measurement value.

According to the second aspect, the density measurement value is measured before and after the processing after the image formation, and the density measurement value conversion value is derived on the basis of the measurement result. Therefore, a preferable density measurement value conversion value corresponding to the density change before and after the processing is derived.

(Third aspect): The image processing method described in the second aspect, in which, in the density measurement value conversion value derivation step, the density measurement value conversion value for every density setting value is derived by calculation using a following equation:

$$(\text{density measurement value after processing})/(\text{density measurement value before processing}) \qquad (1).$$

In the third aspect, the density measurement value conversion value calculated by calculation using equation (1) may be stored as a function using the density setting value as a variable or may be stored in a table format using the density setting value as an index.

(Fourth aspect): The image processing method described in the third aspect, in which, in the density setting value conversion step, a value derived by applying the unevenness correction value at a time of forming the density unevenness measurement image to the density setting value and using equation (1) is read out, and the pre-conversion density measurement value using the unevenness correction value as the density setting value is converted into the post-conversion density measurement value, by multiplying the read density measurement value conversion value by the pre-conversion density measurement value.

According to the fourth aspect, it is possible to convert the pre-conversion density measurement value into the post-conversion density measurement value by multiplication using the density measurement value conversion values.

(Fifth aspect): The image processing method described in any one of the second to fourth aspects, in which: in the pre-processing density measurement value acquisition step, an average value of multiple density measurement values in an array direction of the recording elements is used as the pre-processing density measurement value; and in the post-processing density measurement value acquisition step, an average value of multiple density measurement values in the array direction of the recording elements is used as the post-processing density measurement value.

According to the fifth aspect, the pre-conversion density measurement value is acquired taking into account density variation due to the difference in the characteristics of the recording elements in the array direction of the recording elements.

(Sixth aspect): The image processing method described in any one of the second to fifth aspects, further including a pre-processing readout step of reading out the test image for density measurement using an imaging element before the processing of the formed test image for density measurement, in which, in the pre-processing density measurement value acquisition step, the density measurement value before the processing for every density setting value in the test image for density measurement is acquired from the a readout result in the pre-processing readout step.

According to the sixth aspect, it is possible to survey the density measurement value of the test image for density measurement from the readout result of the imaging element by a non-contact method.

(Seventh aspect): The image processing method described in the sixth aspect, further including a post-processing readout step of reading out the test image for density measurement using the imaging element after the processing step, in which in the post-processing density measurement value acquisition step, the density measurement value after the processing for every density setting value in the test image for density measurement is acquired from a readout result in the post-processing readout step.

According to the seventh aspect, since the density measurement value of the test image for density measurement is surveyed before and after processing by the same technique, the occurrence of an error in the density measurement values before and after conversion may be suppressed.

(Eighth aspect): The image processing method described in any one of the first to seventh aspects, further including a readout step of reading out the formed density unevenness measurement test image using the imaging element, before the processing after the image formation using the recording head, in which in the density measurement value acquisition step, the pre-conversion density measurement value that is the density measurement value of each density setting value for every recording element in the density unevenness measurement test image is acquired from a readout result in the readout step.

As for the imaging elements in the sixth to eighth aspects, by applying the same one, the occurrence of an error in the density measurement value due to solid variation of the imaging element is suppressed.

(Ninth aspect): The image processing method described in any one of the first to eighth aspects, in which the processing after the image formation includes at least any one of drying processing and fixing processing.

According to the ninth aspect, even in a case where the density change occurs before and after the drying processing or the fixing processing, the unevenness correction value is derived taking into account the density change before and after the processing.

(Tenth aspect): An image processing device including: a density measurement value acquisition unit that acquires a pre-conversion density measurement value that is a density measurement value of each density setting value for every recording element, in a density unevenness measurement test image formed based on image data subjected to unevenness correction processing to correct density unevenness due to a recording characteristic of multiple recording elements included in a recording head using a preset unevenness correction value; a density measurement value conversion unit that converts the acquired pre-conversion density measurement value into a post-conversion density measurement value corresponding to a density measurement value after the processing, using a density measurement value conversion value which is derived beforehand and indicates a conversion relationship of the density measurement values before and after the processing for every density setting value and to which the set unevenness correction value is applied as the density setting value; and an unevenness correction value derivation unit that derives a new unevenness correction value using the post-conversion density measurement value.

In the tenth aspect, it is a preferable aspect to include the readout unit that reads out the density unevenness measurement test image using the imaging element, in which density measurement value acquisition unit acquires the pre-conversion density measurement value on the basis of the readout result in the readout unit.

Moreover, it is a preferable aspect that the processing in the processing unit includes at least any one of the drying processing and the fixing processing.

(Eleventh aspect): The image processing device described in the tenth aspect, further including a density measurement value conversion value derivation unit that derives the density measurement value conversion value, in which: the density measurement value acquisition unit acquires a pre-processing density measurement value for every density setting value before the processing in a test image for density measurement formed using the recording head based on the image data to which the unevenness correction processing is applied using the preset unevenness correction value, and acquires a post-processing density measurement value for every density setting value after the processing of the test image for density measurement; and the density measurement value conversion value derivation unit derives the density measurement value conversion value for every density setting value based on the density measurement value before the processing and the density measurement value after the processing, using the set unevenness correction value as the density setting value.

In the eleventh aspect, it is a preferable aspect that the density measurement value conversion value derivation unit derives the density measurement value conversion value for every density setting value by calculation using the following equation:

(density measurement value after processing)/(density measurement value before processing)     (1).

Moreover, it is a preferable aspect that the density measurement value conversion unit reads out a value derived by applying a value of the unevenness correction value at the time of forming the density unevenness measurement image to the density setting value and using equation (1), multiplies the read density measurement value conversion value by the pre-conversion density measurement value and converts the pre-conversion density measurement value using the unevenness correction value as the density setting value into the post-conversion density measurement value.

Moreover, it is a preferable aspect that the density measurement value acquisition unit uses the average value of multiple density measurement values in the array direction of the recording elements as the pre-processing density measurement value or the post-processing density measurement value.

Moreover, it is also a preferable aspect to include the read unit that reads out the density measurement images before and after the processing using the imaging element, in which the density measurement value acquisition unit acquires the density measurement value before the processing and the density measurement value after the processing on the basis of the readout result in the imaging element.

(Twelfth aspect): An image processing program that causes a computer to execute: a density unevenness measurement test image formation step of forming a density unevenness measurement test image based on image data subjected to unevenness correction processing to correct density unevenness due to a recording characteristic of multiple recording elements included in a recording head, using a preset unevenness correction value; a density measurement value acquisition step of acquiring a pre-conversion density measurement value that is a density measurement value of each density setting value for every recording element in the formed density unevenness measurement test image before processing after image formation using the recording head; a density measurement value conversion step of converting the acquired pre-conversion density measurement value into a post-conversion density measurement value corresponding to a density measurement value after the processing, using a density measurement value conversion value which is derived beforehand and indicates a conversion relationship of density measurement values before and after the processing for every density setting value and to which the set unevenness correction value is applied as the density setting value; and an unevenness correction value derivation step of deriving a new unevenness correction value using the post-conversion density measurement value.

In the twelfth aspect, it is a preferable aspect to include: a test image for density measurement formation step of forming a test image for density measurement using the recording head, based on image data to which unevenness correction processing is applied using a preset unevenness correction value; a pre-processing readout step of reading out the test image for density measurement using an imaging element before the processing of the formed test image for density measurement; a pre-processing density measurement value acquisition step of acquiring the density measurement value before the processing for every density setting value in the test image for density measurement, from the a readout result in the pre-processing readout step; a processing step of applying the processing to the formed test image for density measurement; a post-processing readout step of reading out the test image for density measurement using the imaging element after the processing step; a post-processing density measurement value acquisition step of acquiring a density measurement value after the processing for every density setting value in the test image for density measurement, from the readout result in the post-processing readout step; a density measurement value conversion value derivation step of deriving the density measurement value conversion value for every density setting value using the set unevenness correction value as the density setting value, based on the pre-processing density measurement value and the post-processing density measurement value.

Moreover, it is a preferable aspect that the density measurement value conversion value derivation step derives the density measurement value conversion value for every density setting value by calculation using a following equation:

(density measurement value after processing)/(density measurement value before processing)     (1).

Moreover, it is a preferable aspect that the density setting value conversion step reads out a value derived by applying a value of the unevenness correction value at the time of forming the density unevenness measurement image to the density setting value and using equation (1), multiplies the read density measurement value conversion value by the pre-conversion density measurement value and converts the pre-conversion density measurement value using the unevenness correction value as the density setting value into the post-conversion density measurement value.

Moreover, it is a preferable aspect that the pre-processing density measurement value acquisition step uses an average value of multiple density measurement values in an array direction of the recording elements as the pre-processing density measurement value; and the post-processing density measurement value acquisition step uses an average value of multiple density measurement values in the array direction of the recording elements as the post-processing density measurement value.

Moreover, it is a preferable aspect that the processing after the image formation includes at least any one of the drying processing and the fixing processing.

Moreover, it is a preferable aspect to include a pre-processing readout step of reading out the test image for density measurement using an imaging element before the processing of the formed test image for density measurement, in which the pre-processing density measurement value acquisition step acquires the density measurement value before the processing for every density setting value in the test image for density measurement, from the a readout result in the pre-processing readout step.

Moreover, it is a preferable aspect to include a post-processing readout step of reading out the test image for density measurement using the imaging element after the processing step, in which the post-processing density measurement value acquisition step acquires the density measurement value after the processing for every density setting value in the test image for density measurement, from a readout result in the post-processing readout step.

Moreover, it is a preferable aspect to include a readout step of reading out the formed density unevenness measurement test image using the imaging element, before the processing after the image formation using the recording head, in which the density measurement value acquisition step acquires the pre-conversion density measurement value that is the density measurement value of each density setting value for every recording element in the density unevenness measurement test image, from a readout result in the readout step.

Moreover, it is a preferable aspect that the processing after the image formation includes at least any one of drying processing and fixing processing.

(Thirteenth aspect): An image formation device including: a recording head including multiple recording elements; an image processing unit including an unevenness correction processing unit that applies unevenness correction processing for density unevenness due to a recording characteristic of multiple recording elements included in the recording head, to input image data using a preset unevenness correction value; a relative transportation unit that relatively transports a recording medium and the recording head; a density measurement value acquisition unit that is installed on a downstream side of the recording head in a relative movement direction of the recording medium with reference to the recording head and that acquires a pre-conversion density measurement value that is a density measurement value of an image formed using the recording head; a processing unit that is installed on a downstream side of the density measurement value acquisition unit in the relative movement direction of the recording medium with reference to the recording head and that applies processing to the image formed using the recording head; a density measurement value conversion unit that converts the acquired pre-conversion density measurement value into a post-conversion density measurement value corresponding to a density measurement value after the processing, using a density measurement value conversion value which indicates a conversion relationship of the density measurement values before and after the processing by the processing unit for every density setting value and to which the set unevenness correction value is applied as the density setting value; and an unevenness correction value derivation unit that derives a new unevenness correction value using the post-conversion density measurement value, in which: the density measurement value acquisition unit acquires the pre-conversion density measurement value that is a density measurement value of each density setting value for every recording element in a density unevenness measurement test image formed based on the image data subjected to the unevenness correction processing using the preset unevenness correction value in the image processing unit, before the processing by the processing unit; when the new unevenness correction value is derived by the unevenness correction value derivation unit, the unevenness correction processing is applied to the image data using the new unevenness correction value; and the recording head forms a desired image based on the image data to which the unevenness correction processing is applied using the new unevenness correction value.

In the thirteenth aspect, it is a preferable aspect to include the readout unit that reads out the density unevenness measurement test image using the imaging element, in which the density measurement value acquisition unit acquires the pre-conversion density measurement value on the basis of the readout result in the readout unit.

Moreover, it is a preferable aspect that the processing in the processing unit includes at least any one of drying processing and fixing processing.

Moreover, it is a preferable aspect to include a density measurement value conversion value derivation unit that derives the density measurement value conversion value, in which: the readout unit reads out the test image for density measurement formed using the recording head based on the image data to which the unevenness correction processing is applied using the preset unevenness correction value, before the processing and after the processing; the density measurement value acquisition unit acquires the pre-processing density measurement value for every density setting value before the processing of the test image for density measurement and the post-processing density measurement value for every density setting value after the processing of the test image for density measurement from the readout result of the readout unit; and the density measurement value conversion value derivation unit derives the density measurement value conversion value for every density setting value based on the density measurement value before the processing and the density measurement value after the processing, using the preset unevenness correction value as the density setting value.

Moreover, it is a preferable aspect that the density measurement value conversion value derivation unit derives the density measurement value conversion value for every density setting value by calculation using the following equation:

(density measurement value after processing)/(density measurement value before processing)  (1).

Moreover, it is a preferable aspect that the density measurement value conversion unit reads out a value derived by applying a value of the unevenness correction value at the time of forming the density unevenness measurement image to the density setting value and using equation (1), multiplies the read density measurement value conversion value by the pre-conversion density measurement value and converts the pre-conversion density measurement value using the unevenness correction value as the density setting value into the post-conversion density measurement value.

Moreover, it is a preferable aspect that the density measurement value acquisition unit uses the average value of multiple density measurement values in the array direction of the recording elements as the pre-processing density measurement value or the post-processing density measurement value.

Moreover, it is a preferable aspect to include the read unit that reads out the density measurement images before and after the processing using the imaging element, in which the density measurement value acquisition unit acquires the density measurement value before the processing and the density measurement value after the processing on the basis of the readout result in the imaging element.

What is claimed is:
1. An image processing method comprising:
a density unevenness measurement test image formation step of forming a density unevenness measurement test image based on image data subjected to unevenness correction processing to correct density unevenness due to a recording characteristic of multiple recording elements included in a recording head, using a preset unevenness correction value;
a density measurement value acquisition step of acquiring a pre-conversion density measurement value that is a density measurement value of each density setting value for every recording element in the density unevenness measurement test image before processing after image formation using the recording head;
a density measurement value conversion step of converting the acquired pre-conversion density measurement value into a post-conversion density measurement value corresponding to a density measurement value after the processing, using a density measurement value conversion value which is derived beforehand and indicates a conversion relationship of density measurement values before and after the processing for every density setting value and to which the set unevenness correction value is applied as the density setting value; and an unevenness correction value derivation step of deriving a new unevenness correction value using the post-conversion density measurement value.

2. The image processing method according to claim 1, further comprising:
a test image for density measurement formation step of forming a test image for density measurement using the recording head, based on image data to which unevenness correction processing is applied using the preset unevenness correction value;
a pre-processing density measurement value acquisition step of acquiring a density measurement value before the processing for every density setting value in the test image for density measurement before the processing of the formed test image for density measurement;
a processing step of applying the processing to the formed test image for density measurement;
a post-processing density measurement value acquisition step of acquiring a density measurement value after the processing for every density setting value in the test image for density measurement after the processing step; and
a density measurement value conversion value derivation step of deriving the density measurement value conversion value for every density setting value using the set unevenness correction value as the density setting value, based on the pre-processing density measurement value and the post-processing density measurement value.

3. The image processing method according to claim 2, wherein in the density measurement value conversion value derivation step, the density measurement value conversion value for every density setting value is derived by calculation using a following equation:

(density measurement value after processing)/(density measurement value before processing)    (1).

4. The image processing method according to claim 3, wherein in the density setting value conversion step, a value derived by applying the unevenness correction value at a time of forming the density unevenness measurement image to the density setting value and using the equation (1) is read out, and the pre-conversion density measurement value using the unevenness correction value as the density setting value is converted into the post-conversion density measurement value, by multiplying the read density measurement value conversion value by the pre-conversion density measurement value.

5. The image processing method according to claim 2, wherein:
in the pre-processing density measurement value acquisition step, an average value of multiple density measurement values in an array direction of the recording elements is used as the pre-processing density measurement value; and
in the post-processing density measurement value acquisition step, an average value of multiple density measurement values in the array direction of the recording elements is used as the post-processing density measurement value.

6. The image processing method according to claim 2, further comprising a pre-processing readout step of reading out the test image for density measurement using an imaging element before the processing of the formed test image for density measurement, wherein in the pre-processing density measurement value acquisition step, the density measurement value before the processing for every density setting value in the test image for density measurement is acquired from a readout result in the pre-processing readout step.

7. The image processing method according to claim 6, further comprising a post-processing readout step of reading out the test image for density measurement using the imaging element after the processing step, wherein in the post-processing density measurement value acquisition step, the density measurement value after the processing for every density setting value in the test image for density measurement is acquired from a readout result in the post-processing readout step.

8. The image processing method according to claim 1, further comprising a readout step of reading out the formed density unevenness measurement test image using the imaging element, before the processing after the image formation using the recording head, wherein in the density measurement value acquisition step, the pre-conversion density measurement value that is the density measurement value of each density setting value for every recording element in the density unevenness measurement test image is acquired from a readout result in the readout step.

9. The image processing method according to claim 1, wherein the processing after the image formation includes at least any one of drying processing and fixing processing.

10. An image processing device comprising:
a density measurement value acquisition unit configured to acquire a pre-conversion density measurement value that is a density measurement value of each density setting value for every recording element, in a density unevenness measurement test image formed based on image data subjected to unevenness correction processing to correct density unevenness due to a recording characteristic of multiple recording elements included in a recording head using a preset unevenness correction value;
a density measurement value conversion unit configured to convert the acquired pre-conversion density measurement value into a post-conversion density measurement value corresponding to a density measurement value after the processing, using a density measurement value conversion value which is derived beforehand and indicates a conversion relationship of the density measurement values before and after the processing for every density setting value and to which the set unevenness correction value is applied as the density setting value; and
an unevenness correction value derivation unit configured to derive a new unevenness correction value using the post-conversion density measurement value.

11. The image processing device according to claim 10, further comprising a density measurement value conversion value derivation unit configured to derive the density measurement value conversion value, wherein:
the density measurement value acquisition unit acquires a pre-processing density measurement value for every density setting value before the processing in a test image for density measurement formed using the recording head based on the image data to which the unevenness correction processing is applied using the preset unevenness correction value, and acquires a post-processing density measurement value for every density setting value after the processing of the test image for density measurement; and the density measurement value conversion value derivation unit derives the density measurement value conversion value for every density setting value based on the density measurement value before the processing and the density measurement value after the processing, using the preset unevenness correction value as the density setting value.

12. A non-transitory computer-readable recording medium including instructions stored thereon, such that when the instructions are read and executed by a processor, the processor is configured to perform the steps of:

a density unevenness measurement test image formation step of forming a density unevenness measurement test image based on image data subjected to unevenness correction processing to correct density unevenness due to a recording characteristic of multiple recording elements included in a recording head, using a preset unevenness correction value;

a density measurement value acquisition step of acquiring a pre-conversion density measurement value that is a density measurement value of each density setting value for every recording element in the formed density unevenness measurement test image before processing after image formation using the recording head;

a density measurement value conversion step of converting the acquired pre-conversion density measurement value into a post-conversion density measurement value corresponding to a density measurement value after the processing, using a density measurement value conversion value which is derived beforehand and indicates a conversion relationship of density measurement values before and after the processing for every density setting value and to which the set unevenness correction value is applied as the density setting value; and an unevenness correction value derivation step of deriving a new unevenness correction value using the post-conversion density measurement value.

13. An image formation device comprising:

a recording head including multiple recording elements;

an image processing unit including an unevenness correction processing unit configured to apply unevenness correction processing for density unevenness due to a recording characteristic of multiple recording elements included in the recording head, to input image data using a preset unevenness correction value;

a relative transportation unit configured to relatively transport a recording medium and the recording head;

a density measurement value acquisition unit that is installed on a downstream side of the recording head in a relative movement direction of the recording medium with reference to the recording head, the density measurement value acquisition unit configured to acquire a pre-conversion density measurement value that is a density measurement value of an image formed using the recording head;

a processing unit that is installed on a downstream side of the density measurement value acquisition unit in the relative movement direction of the recording medium with reference to the recording head, the processing unit configured to apply processing to the image formed using the recording head;

a density measurement value conversion unit configured to convert the acquired pre-conversion density measurement value into a post-conversion density measurement value corresponding to a density measurement value after the processing, using a density measurement value conversion value which indicates a conversion relationship of the density measurement values before and after the processing by the processing unit for every density setting value and to which the set unevenness correction value is applied as the density setting value; and an unevenness correction value derivation unit configured to derive a new unevenness correction value using the post-conversion density measurement value, wherein:

the density measurement value acquisition unit acquires the pre-conversion density measurement value that is a density measurement value of each density setting value for every recording element in a density unevenness measurement test image formed based on the image data subjected to the unevenness correction processing using the preset unevenness correction value in the image processing unit, before the processing by the processing unit;

when the new unevenness correction value is derived by the unevenness correction value derivation unit, the unevenness correction processing is applied to the image data using the new unevenness correction value; and the recording head forms a desired image based on the image data to which the unevenness correction processing is applied using the new unevenness correction value.

* * * * *